US010982067B2

(12) United States Patent
Baghdadi et al.

(10) Patent No.: US 10,982,067 B2
(45) Date of Patent: Apr. 20, 2021

(54) FOAM IONOMER COMPOSITIONS AND USES THEREOF

(71) Applicant: NIKE, Inc., Beaverton, OR (US)

(72) Inventors: Hossein A. Baghdadi, Portland, OR (US); Jay Constantinou, Beaverton, OR (US); Kato Killops, Beaverton, OR (US); Brian Prevo, Beaverton, OR (US); Zachary C. Wright, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 376 days.

(21) Appl. No.: 15/975,882

(22) Filed: May 10, 2018

(65) Prior Publication Data

US 2018/0327564 A1 Nov. 15, 2018

Related U.S. Application Data

(60) Provisional application No. 62/504,490, filed on May 10, 2017.

(51) Int. Cl.
A43B 1/00 (2006.01)
A43B 1/14 (2006.01)
(Continued)

(52) U.S. Cl.
CPC ............... C08J 9/122 (2013.01); A43B 1/14 (2013.01); A43B 13/00 (2013.01); A43B 17/003 (2013.01);
(Continued)

(58) Field of Classification Search
CPC ...... C08J 9/122; C08J 9/0061; C08J 2333/04; C08J 2323/08; C08J 2333/02;
(Continued)

(56) References Cited

U.S. PATENT DOCUMENTS 4,171,411 A 10/1979 Ehrenfreund
4,418,483 A 12/1983 Fujita et al.
(Continued)

FOREIGN PATENT DOCUMENTS

CN 1997693 A 7/2007
CN 103764735 A 4/2014
(Continued)

OTHER PUBLICATIONS

Office Action issued by the USPTO for U.S. Appl. No. 15/297,209 dated Feb. 27, 2018.
(Continued)

Primary Examiner — Kara B Boyle
(74) Attorney, Agent, or Firm — Thomas|Horstemeyer, LLP

(57) ABSTRACT

Components for articles of footwear and athletic equipment are provided including a foam. A variety of foams and foam components are provided. The articles include a composition having a foam structure, wherein the composition includes an ionomeric polymer and a plurality of cations, wherein the ionomeric copolymer is crosslinked by the cations. The crosslinks are ionic, so in some aspects the composition is free or essentially free of any covalent crosslinks between the ionomers. In particular, midsoles including the foams are provided for use in an article of footwear. Methods of making the compositions and foams are provided, as well as methods of making an article of footwear including one of the foam components. In some aspects, the foams and foam components can be made by injection molding or injection molding followed by compression molding.

18 Claims, 4 Drawing Sheets

(51) Int. Cl.

| | | |
|---|---|---|
| *C08J 9/00* | (2006.01) | |
| *C08J 9/12* | (2006.01) | |
| *C08L 33/08* | (2006.01) | |
| *A43B 17/00* | (2006.01) | |
| *A43B 13/00* | (2006.01) | |
| *A43B 5/06* | (2006.01) | |
| *A43B 13/04* | (2006.01) | |
| *A43B 13/16* | (2006.01) | |
| *A43B 13/12* | (2006.01) | |
| *A43B 7/14* | (2006.01) | |
| *A43B 13/22* | (2006.01) | |
| *A43B 13/14* | (2006.01) | |
| *A43B 13/18* | (2006.01) | |
| *B29D 35/12* | (2010.01) | |

(52) U.S. Cl.
CPC .............. *C08J 9/0061* (2013.01); *C08L 33/08* (2013.01); *A43B 5/06* (2013.01); *A43B 7/14* (2013.01); *A43B 7/144* (2013.01); *A43B 13/04* (2013.01); *A43B 13/125* (2013.01); *A43B 13/141* (2013.01); *A43B 13/16* (2013.01); *A43B 13/188* (2013.01); *A43B 13/223* (2013.01); *B29D 35/122* (2013.01); *C08J 2201/026* (2013.01); *C08J 2203/06* (2013.01); *C08J 2203/08* (2013.01); *C08J 2205/10* (2013.01); *C08J 2207/00* (2013.01); *C08J 2300/105* (2013.01); *C08J 2323/08* (2013.01); *C08J 2331/04* (2013.01); *C08J 2333/02* (2013.01); *C08J 2333/04* (2013.01); *C08J 2333/08* (2013.01); *C08J 2423/08* (2013.01); *C08J 2431/04* (2013.01)

(58) Field of Classification Search
CPC .............. C08J 2423/08; C08J 2201/026; C08J 2431/04; C08J 2300/105; C08J 2207/00; C08J 2331/04; C08J 2203/06; C08J 2203/08; C08J 2205/10; C08J 2333/08; A43B 13/00; A43B 17/003; A43B 1/14; A43B 13/16; A43B 13/125; A43B 7/144; A43B 13/223; A43B 13/141; A43B 13/188; A43B 7/14; A43B 5/06; A43B 13/04; C08L 33/08; B29D 35/122
See application file for complete search history.

(56) References Cited

U.S. PATENT DOCUMENTS

| | | | |
|---|---|---|---|
| 4,480,054 A | | 10/1984 | Enderle |
| 5,482,285 A | † | 1/1996 | Yabuki |
| 5,670,102 A | | 9/1997 | Perman et al. |
| 5,789,505 A | | 8/1998 | Wilkinson et al. |
| 5,816,944 A | † | 10/1998 | Asakura |
| 6,598,252 B2 | | 7/2003 | Woerlee |
| 6,620,211 B2 | | 9/2003 | Veugelers et al. |
| 6,797,737 B1 | * | 9/2004 | Hsu ..................... C08L 23/0853 36/43 |
| 6,849,667 B2 | | 2/2005 | Haseyama et al. |
| 6,878,753 B1 | | 4/2005 | Takemura et al. |
| 7,731,763 B2 | | 6/2010 | Fernandez Cid et al. |
| 7,861,733 B2 | | 1/2011 | Pellikaan et al. |
| 7,938,865 B2 | | 5/2011 | Fernandez Cid et al. |
| 9,243,104 B2 | | 1/2016 | Watkins et al. |
| 2002/0045040 A1 | | 4/2002 | Kanada et al. |
| 2004/0041292 A1 | | 3/2004 | Chen et al. |
| 2004/0080070 A1 | | 4/2004 | Liu et al. |
| 2008/0005856 A1 | | 1/2008 | Hung |
| 2008/0305890 A1 | * | 12/2008 | Watanabe .......... A63B 37/0076 473/373 |
| 2010/0222442 A1 | | 9/2010 | Prissok et al. |
| 2011/0047720 A1 | | 3/2011 | Maranan et al. |
| 2011/0138547 A1 | | 6/2011 | Fernandez Cid et al. |
| 2011/0232135 A1 | | 9/2011 | Dean et al. |
| 2011/0275732 A1 | | 11/2011 | Bruchmann et al. |
| 2011/0283560 A1 | | 11/2011 | Portzline et al. |
| 2012/0003457 A1 | | 1/2012 | Hatanaka et al. |
| 2014/0151918 A1 | | 6/2014 | Hartmann |
| 2018/0229084 A1 | * | 8/2018 | Sullivan ............. A63B 37/0075 |

FOREIGN PATENT DOCUMENTS

| | | | |
|---|---|---|---|
| EP | 1266928 A1 | | 12/2002 |
| EP | 2649896 A2 | | 10/2013 |
| JP | 10151647 | | 6/1998 |
| JP | 2008037962 A | | 2/2008 |
| KR | 1019840000425 B1 | | 4/1984 |
| KR | 100539131 B1 | | 12/2005 |
| WO | 9420568 A1 | | 9/1994 |
| WO | 2001/002473 | † | 1/2001 |
| WO | 2012065926 A1 | | 5/2012 |
| WO | 2013013784 A1 | | 1/2013 |
| WO | 2017000162 A1 | | 1/2017 |

OTHER PUBLICATIONS

Eurpoean Search Report for Application 17170692.2-1377, dated Jul. 31, 2017.
Office Action Issued by the Chinese Patent Office for Application 201480015776.9, dated May 27, 2017.
PCT International Search Report and Written Opinion for PCT/US2014/022280 dated Aug. 1, 2014.
PCT International Preliminary Report on Patentability CHII for PCT Application No. PCT/US2014/022280, dated Jun. 2,2015, 15 pgs.
LeGrand, D.G. Annealing. Encyclopedia of Polyclopedia of Polymer Science and Technology. John Wiley and Sons, Inc. Published Online Feb. 15, 2011.
3, 5-Dimethyl-1-hexyn-3-ol MSDS. Sigma-Aldrich. Sep. 25, 2013.
International Search Report for PCT/US2018/031938 dated Sep. 9, 2018.
Database WPI, Week 200818, Thomson Scientifice, London, GB; AN 2008-C42694, XP002783547.
International Preliminary Examining Authority for PCTUS2018031938 dated May 3, 2019.
Written Opinion of the International Preliminary Examining Authority for PCTUS2018031938 dated Aug. 23, 2019.
International Search Report for PCT/US2018/031938 dated Sep. 13, 2018.
Database WPI 1-18 Week 200818 Thomson Scientific, London, GB; AN 2008-C42694 XP002783547.

\* cited by examiner
† cited by third party

FOAM IONOMER COMPOSITIONS AND USES THEREOF

CROSS-REFERENCE TO RELATED APPLICATIONS

This application claims priority to, and the benefit of, U.S. provisional application entitled "FOAM IONOMER COMPOSITIONS AND USES THEREOF" having Ser. No. 62/504,490, filed May 10, 2017, the contents of which are incorporated by reference in their entirety.

TECHNICAL FIELD

The present disclosure generally relates to foams formed of ionomeric polymers, and in particular to foams formed of ionomeric polymers which are suitable for the footwear and related industries and uses thereof.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

BRIEF DESCRIPTION OF THE DRAWINGS

Further aspects of the present disclosure will be readily appreciated upon review of the detailed description, described below, when taken in conjunction with the accompanying drawings.

DETAILED DESCRIPTION

Figure 1:
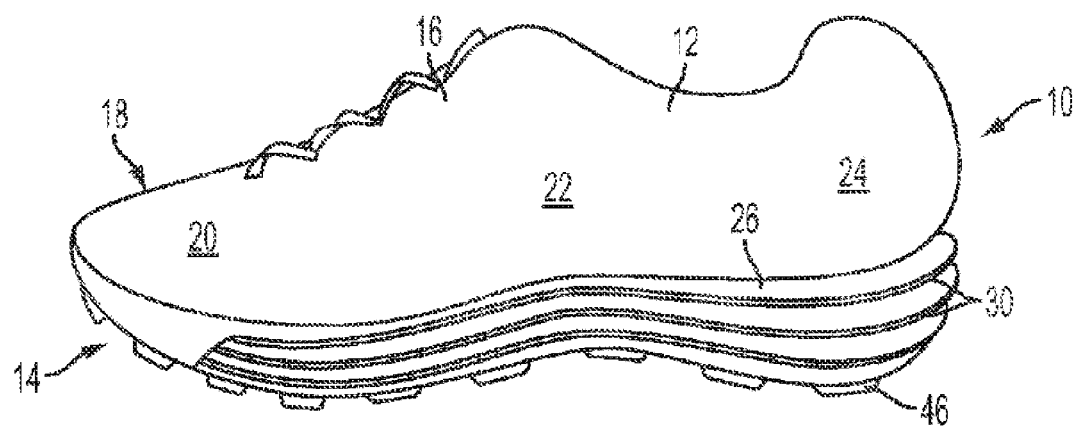
FIG. 1 is an elevation view of an article of footwear with a sole component according to an aspect of the invention.

The present disclosure is directed to a foam formed of ionomeric polymers, i.e., ionomer foam. The ionomer foams are formed from polymeric compositions comprising one or more ionomeric copolymer. Examples of ionomeric polymers include polymers which have one or more carboxylic acid moiety present in the polymeric backbone, on one or more side chains, or both in the polymeric backbone and on one or more side chains. The one or more carboxylic acid moiety of the ionomeric copolymer can include a free carboxylic acid, a salt of a carboxylic acid, or an anhydride of a carboxylic acid. In particular examples, the carboxylic acid moiety can be an acrylic acid moiety or a methacrylic acid moiety. The ionomer foam of the present disclosure is suitable for use in a variety of articles including for athletic equipment and apparel, particularly footwear (e.g., athletic footwear midsoles/outsoles). As discussed below, the ionomer foam exhibits a unique balance of properties such as high energy return, high split tear, low specific gravity, and low compression set. Furthermore, the ionomer foam can also be reprocessed with minimal loss in physical properties (e.g., for recycling), providing a solution for materials sustainability.

It has been found that ionomeric polymers having particular ranges of flexural modulus (e.g., less than 100 Mega Pascals (MPa)), hardness (e.g., less than 45 MPa) can be used to produce ionomer foams suitable for use as cushioning materials, such as for use in apparel, articles of footwear, and sports equipment. It has been found that these ionomeric polymers can be used to produce ionomer foams having unexpectedly high levels of energy return and other properties making them useful as cushioning materials for use in articles of footwear, particularly when these ionomeric polymers are foamed by an injection molding process using supercritical fluids as physical blowing agents. The use of fatty acid modified ionomeric polymers has also been found to produce ionomer foams having unexpectedly high levels of energy return and other properties making them useful as cushioning materials for use in articles of footwear. Additionally, the storage modulus (e.g., over temperatures from −10 degrees Celsius to 40 degrees Celsius) and the tan delta (δ) of the ionomer polymers have been identified as being predictive of whether or not the ionomer polymers will be produce foams suitable for use as cushioning materials.

In a first aspect, the present disclosure is directed to an article comprising a composition, wherein the composition comprises one or more ionomeric copolymers, wherein each of the one or more ionomeric copolymers includes chain units derived from one or more olefins and chain units derived from one or more ethylenically-unsaturated acid groups; and a plurality of cations, wherein the cations ionically crosslink anionic groups from the acid groups in the ionomeric copolymers; wherein the composition has a foam structure having a specific gravity of less than 0.7.

In a second aspect, the present disclosure is directed to an article comprising a composition, wherein the composition comprises a plurality of ionomeric copolymers, wherein each of the ionomeric copolymers comprises a plurality of a first repeat unit having a formula according to Formula I and a plurality of a second repeat unit having a formula according to Formula II, and

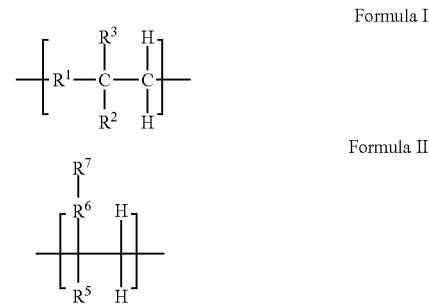

a plurality of cations, wherein each of the cations is crosslinking two or more of the second repeat units; wherein each occurrence of $R^1$ is independently none, a substituted or unsubstituted $C_1$-$C_8$ alkyl, or a substituted or unsubstituted $C_2$-$C_8$ alkenyl; wherein each occurrence of $R^2$ is independently hydrogen, a halogen, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, a substituted or unsubstituted $C_1$-$C_8$ alkoxy, or a substituted or unsubstituted $C_3$-$C_{12}$ alkyl ester; wherein each occurrence of $R^3$ is independently hydrogen, a substituted or unsubstituted $C_1$-$C_8$ alkyl, or a substituted or unsubstituted $C_2$-$C_8$ alkenyl; wherein each occurrence of $R^5$ is independently a hydrogen, a halogen, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, a substituted or unsubstituted C1-C8 alkoxy, or a substituted or unsubstituted $C_3$-$C_{12}$ alkyl ester; wherein each occurrence of $R^6$ is independently none, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, or a substituted or unsubstituted $C_1$-$C_8$ alkoxy; wherein each occurrence of $R^7$ is independently a carboxylate, a sulfate, a sulfonate, a nitrate, a phosphate, a phosphonate, or another negatively charged functional group; and wherein the composition is a foam having a specific gravity of less than 0.7.

In a third aspect, the present disclosure is directed to a method of making an article, the method comprising: receiving a composition comprising one or more ionomeric copolymers, wherein each of the one or more ionomeric copolymers includes chain units of one or more olefins and one or more acid groups; and a plurality of cations, wherein the cations ionically crosslink anionic groups in the ionomeric copolymers; and physically foaming the composition, forming a foam having a specific gravity of less than 0.7.

In a fourth aspect, the present disclosure is directed to a method of making an article, the method comprising receiving a composition comprising: a plurality of ionomeric copolymers, wherein each of the ionomeric copolymers comprises a plurality of a first repeat unit having a formula according to Formula I and a plurality of a second repeat unit having a formula according to Formula II, and

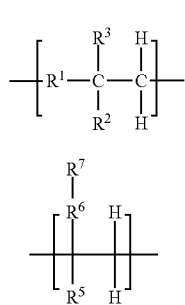

Formula I

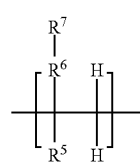

Formula II a plurality of cations, wherein each of the cations is crosslinking two or more of the second repeat units; wherein each occurrence of $R^1$ is independently none, a substituted or unsubstituted $C_1$-$C_8$ alkyl, or a substituted or unsubstituted $C_2$-$C_8$ alkenyl; wherein each occurrence of $R^2$ is independently hydrogen, a halogen, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, a substituted or unsubstituted $C_1$-$C_8$ alkoxy, or a substituted or unsubstituted $C_3$-$C_{12}$ alkyl ester; wherein each occurrence of $R^3$ is independently hydrogen, a substituted or unsubstituted $C_1$-$C_8$ alkyl, or a substituted or unsubstituted $C_2$-$C_8$ alkenyl; wherein each occurrence of $R^5$ is independently a hydrogen, a halogen, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, a substituted or unsubstituted C1-C8 alkoxy, or a substituted or unsubstituted $C_3$-$C_{12}$ alkyl ester; wherein each occurrence of $R^6$ is independently none, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, or a substituted or unsubstituted $C_1$-$C_8$ alkoxy; and wherein each occurrence of $R^7$ is independently a carboxylate, a sulfate, a sulfonate, a nitrate, a phosphate, a phosphonate, or another negatively charged functional group; and physically foaming the composition, forming a foam having a specific gravity of less than 0.7.

In a fifth aspect, the present disclosure is directed to a method of forming a foam article, the method comprising: forming a melt of a first composition at a first pressure, wherein the first composition comprises one or more ionomeric copolymers, wherein each of the one or more ionomeric copolymers includes chain units of one or more olefins and one or more ethylenically-unsaturated acid groups; a plurality of cations; and a fluid; introducing the melt to a second pressure less than the first pressure, causing a portion of the fluid to leave the melt and forming a foam structure in the melt; and simultaneously with the introducing or sequentially following the introducing, cooling the melt to a temperature below a melting point of the first composition, causing a portion of the plurality of cations to ionically crosslink anionic groups from the acid groups in the ionomeric copolymers, forming the foamed article.

In a sixth aspect, the present disclosure is directed to a method of forming a foam article, the method comprising: forming a melt of a first composition at a first pressure, wherein the first composition comprises a plurality of ionomeric copolymers, wherein each of the ionomeric copolymers comprises a plurality of a first repeat unit having a formula according to Formula I and a plurality of a second repeat unit having a formula according to Formula II, and

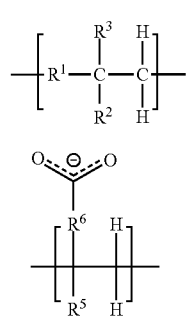

Formula I

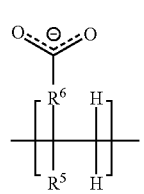

Formula II a plurality of cations, and a fluid; introducing the melt to a second pressure less than the first pressure, causing a portion of the fluid to leave the melt and forming a foam structure in the melt; and simultaneously with the introducing or sequentially following the introducing, cooling the melt to a temperature below a melting point of the first composition, causing a portion of the plurality of cations to ionically crosslink two or more of the second repeat units, forming the foamed article.

In a seventh aspect, the present disclosure is directed to a foam article made by a process comprising: cutting or grinding a previously molded foam article to form particulates, wherein the recycled foam article is an article described herein; melting the particulates into pellets to form the recycled material; and forming a foam article via a method according to a method described herein, wherein the recycled material is used to form the melt of the first composition.

Footwear 10 is an exemplary article of athletic footwear that includes the ionomer foam of the present disclosure. While illustrated as a running shoe, footwear 10 may alternatively be configured for any suitable athletic performance, such as baseball shoes, basketball shoes, soccer/global football shoes, American football shoes, running shoes, cross-trainer shoes, cheerleading shoes, golf shoes, and the like. While an athletic shoe is exemplified in FIG. 1, it will be readily understood that some of the terminology employed will also apply to other articles of footwear or to other styles of shoe. Footwear 10 includes an upper 12 and a sole component 14 secured to upper 12. Sole component 14 can be secured to upper 12 by adhesive or any other suitable means. As used herein, the sole component 14 can be a monolithic component formed entirely of the ionomer foam material as described herein, or a multi-component assembly formed of a plurality of monolithic components, where at least one of the monolithic components is formed entirely of the ionomer foam material as described herein.

Footwear 10 has a medial, or inner, side 16 and a lateral, or outer, side 18. For ease of discussion, footwear 10 can be divided into three portions: a forefoot portion 20, a midfoot portion 22, and a heel portion 24. Portions 20, 22, and 24 are not intended to demarcate precise areas of footwear 10. Rather, portions 20, 22, and 24 are intended to represent respective areas of footwear 10 that provide a frame of reference during the following discussion. Unless indicated otherwise, directional terms used herein, such as rearwardly, forwardly, top, bottom, inwardly, downwardly, upwardly, etc., refer to directions relative to footwear 10 itself. Footwear 10 is shown in FIG. 1 in a substantially horizontal orientation, as it would be positioned on a horizontal surface when worn by a wearer. However, it is to be appreciated that footwear 10 need not be limited to such an orientation. Thus, in FIG. 1, rearwardly is toward heel portion 24 (to the right as seen in FIG. 1), forwardly is toward forefoot portion 20 (to the left as seen in FIG. 1), and downwardly is toward the bottom of the page as seen in FIG. 1. Top refers to elements toward the top of the view in FIG. 1, while bottom refers to elements toward the bottom of the view in FIG. 1. Inwardly is toward the center of footwear 10, and outwardly is toward the outer peripheral edge of footwear 10.

In some aspects, the component is a sole component, such as a sole component 14 depicted in FIGS. 1-5, that includes an ionomer foam described herein. In some aspects, the component is an insert such as insert 36 or insert 60 depicted in FIGS. 4-5 that includes an ionomer foam described herein. The sole components and inserts for sole components can be made partially or entirely of an ionomer foam described herein. Any portion of a sole component or an insert for a sole component can be made of an ionomer foam described herein. For example, first portion 26 of the sole component (optionally including the ground engaging lower surface 44, such as the plurality of projections 46 and/or the groove 48 surrounding the projections), the entire insert 36, portions 62 or 64 of insert 60, a separate outsole component, or any combination thereof, can include an ionomer foam as described herein. The sole components and inserts can be made by foaming ionomeric polymers as described herein, for example by injection molding or by injection molding followed by compression molding as described herein. In some aspects, the ionomer foams can be formed by physical foaming of the compositions. The ionomer foams and components can demonstrate improved physical properties including one or more of an enhanced energy return, and enhanced split tear, a decreased specific gravity, or a combination thereof.

Sole component 14, which is generally disposed between the foot of the wearer and the ground, provides attenuation of ground reaction forces (i.e., imparting cushioning), traction, and may control foot motions, such as pronation. As with conventional articles of footwear, sole component 14 can include an insole (not shown) located within upper 12. In some aspects, the sole component is an insole or sockliner or is a multi-component assembly including an insole or sockliner, can further include an insole or sockliner located within the upper, where the insole or sockliner is formed entirely or partially of an ionomer foam described herein. Articles of footwear described herein can include an insole or sockliner formed entirely or partially of an ionomer foam described herein.

Figure 2:
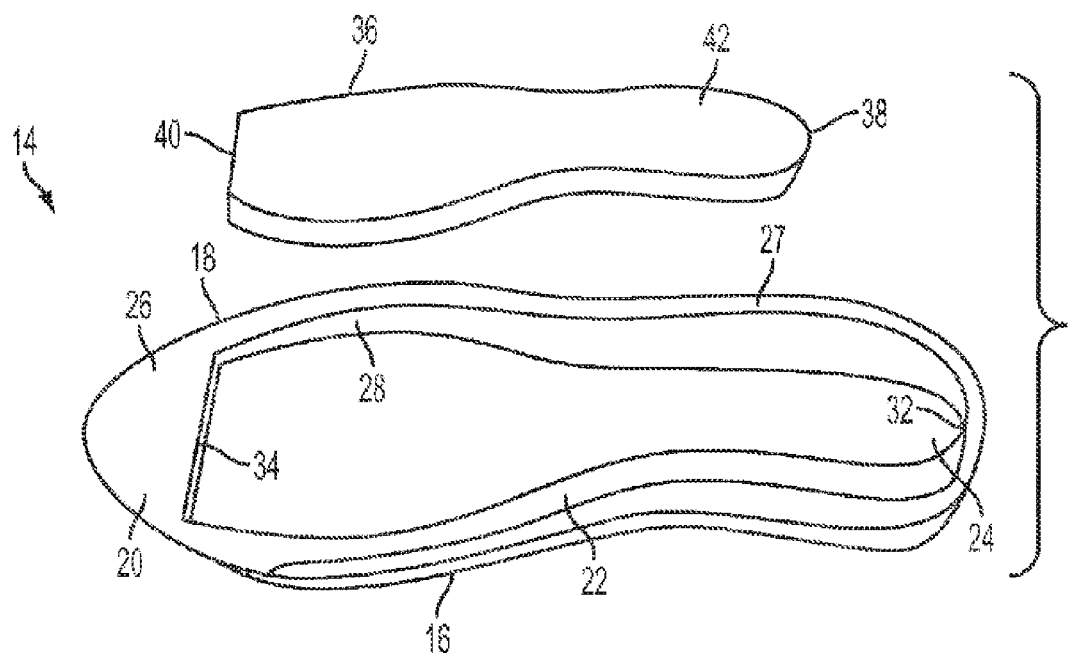
FIG. 2 is an exploded view of the sole component of the article of footwear of FIG. 1.

As can be seen in FIG. 2, sole component 14 consists of a first portion 26 having an upper surface 27 with a recess 28 formed therein. Upper surface 27 is secured to upper 12 with adhesive or other suitable fastening means. A plurality of substantially horizontal ribs 30 is formed on the exterior of first portion 26. In certain aspects, ribs 30 extend from a central portion of forefoot portion 20 on medial side 16 rearwardly along first portion 26, around heel portion 24 and forwardly on lateral side 18 of first portion 26 to a central portion of forefoot portion 20.

First portion 26 provides the external traction surface of sole component 14. In certain aspects it is to be appreciated that a separate outsole component could be secured to the lower surface of first portion 26. When a separate outsole component is secured to the lower surface of first portion 26, the first portion 26 is a midsole component. In some aspects, the article is a midsole component for an article of footwear.

In some aspects, the article is an insert. An insert 36 can be received in recess 28. As illustrated in FIG. 2, insert 36 can provide cushioning or resiliency in the sole component. First portion 26 can provide structure and support for insert 36. In such aspects, first portion 26 can be formed of a material of higher specific gravity and/or hardness as compared to insert 36 such as, for example, non-foam materials including rubber and thermoplastic polyurethane, as well as foam materials. In certain aspects, insert 36 can be formed of an ionomer foam as disclosed herein.

Insert 36 has a curved rear surface 38 to mate with curved rear surface 32 of recess 28 and a transverse front surface 40 to mate with transverse front surface 34 of recess 28. An upper surface 42 of insert 36 is in contact with and secured to upper 12 with adhesive or other suitable fastening means. For example, when there is an insert 36, a recess 28 can extend from heel portion 24 to forefoot portion 20. In certain aspects, the rear surface 32 of recess 28 is curved to substantially follow the contour of the rear of heel portion 24 and the front surface 34 of recess 28 extends transversely across first portion 26.

Figure 3:
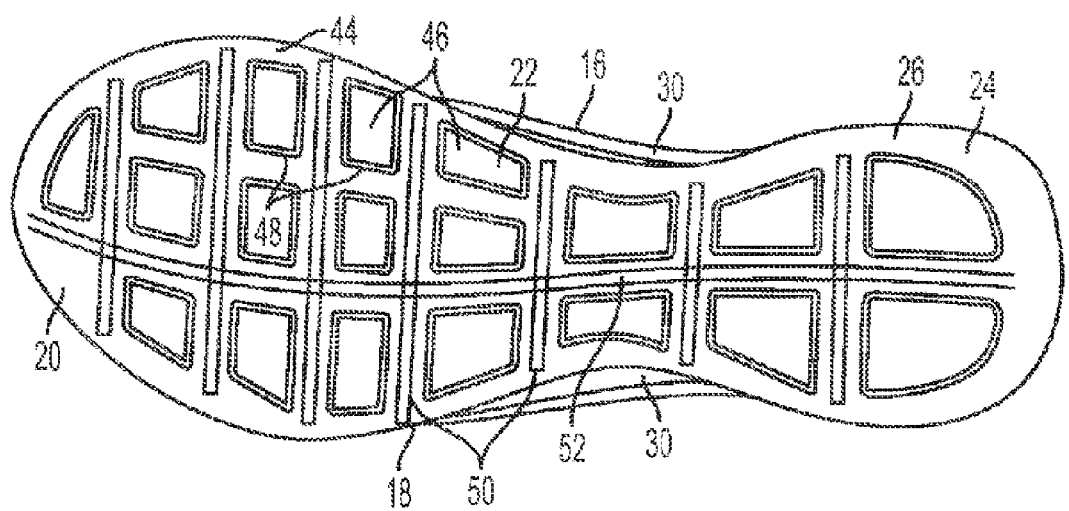
FIG. 3 is a plan view of the bottom of the sole component of the article of footwear of FIG. 1.

As seen best in FIG. 3, a ground engaging lower surface 44 of first portion 26 includes a plurality of projections 46. Each projection 46 is surrounded by a groove 48. A plurality of transverse slots 50 are formed in lower surface 44, extending between adjacent projections 46. A longitudinal slot 52 extends along lower surface 44 from heel portion 26 to forefoot portion 20.

Figure 4:
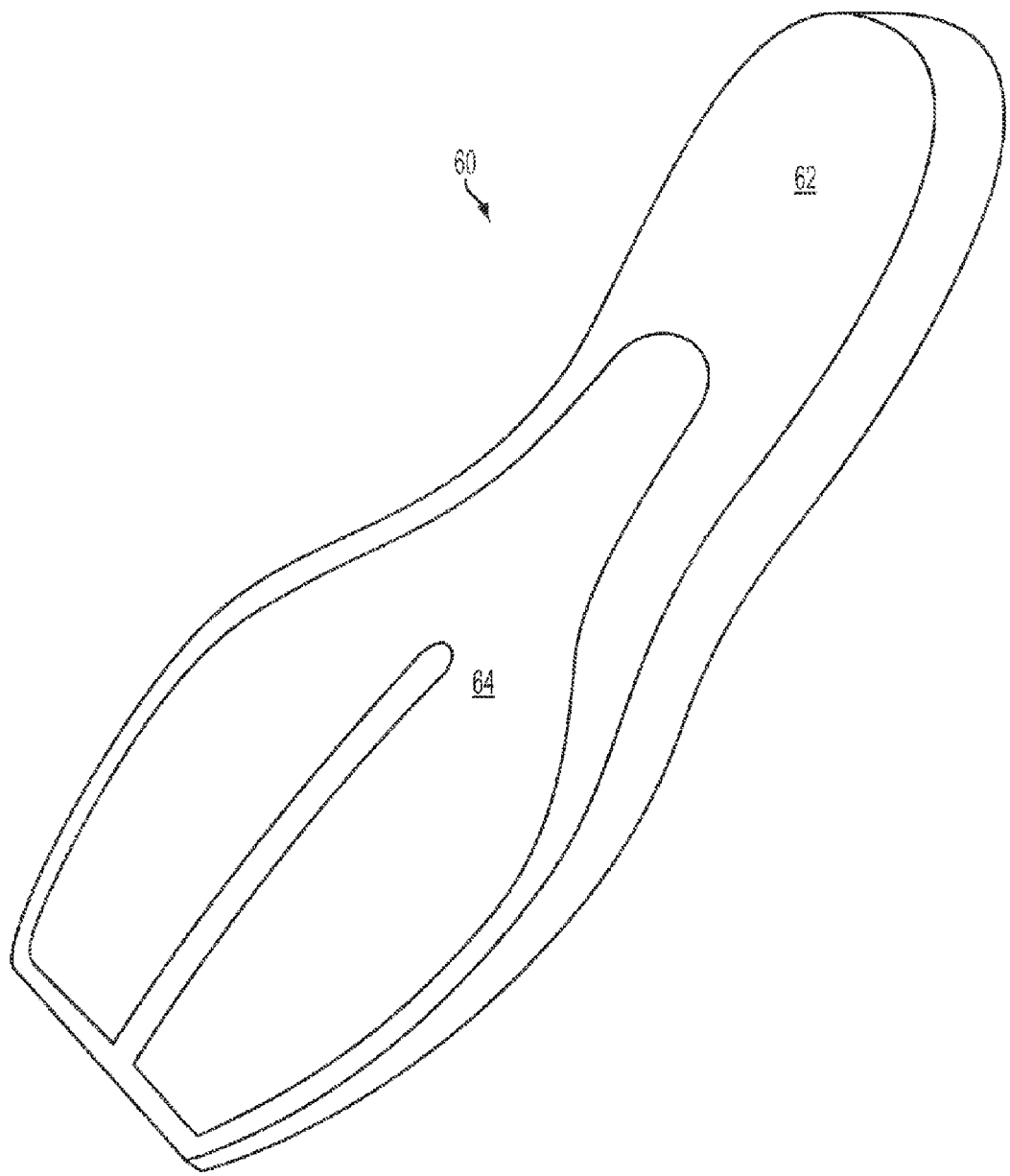
FIG. 4 is a bottom view of an insert for use in a sole component of an article of footwear.
Figure 5:
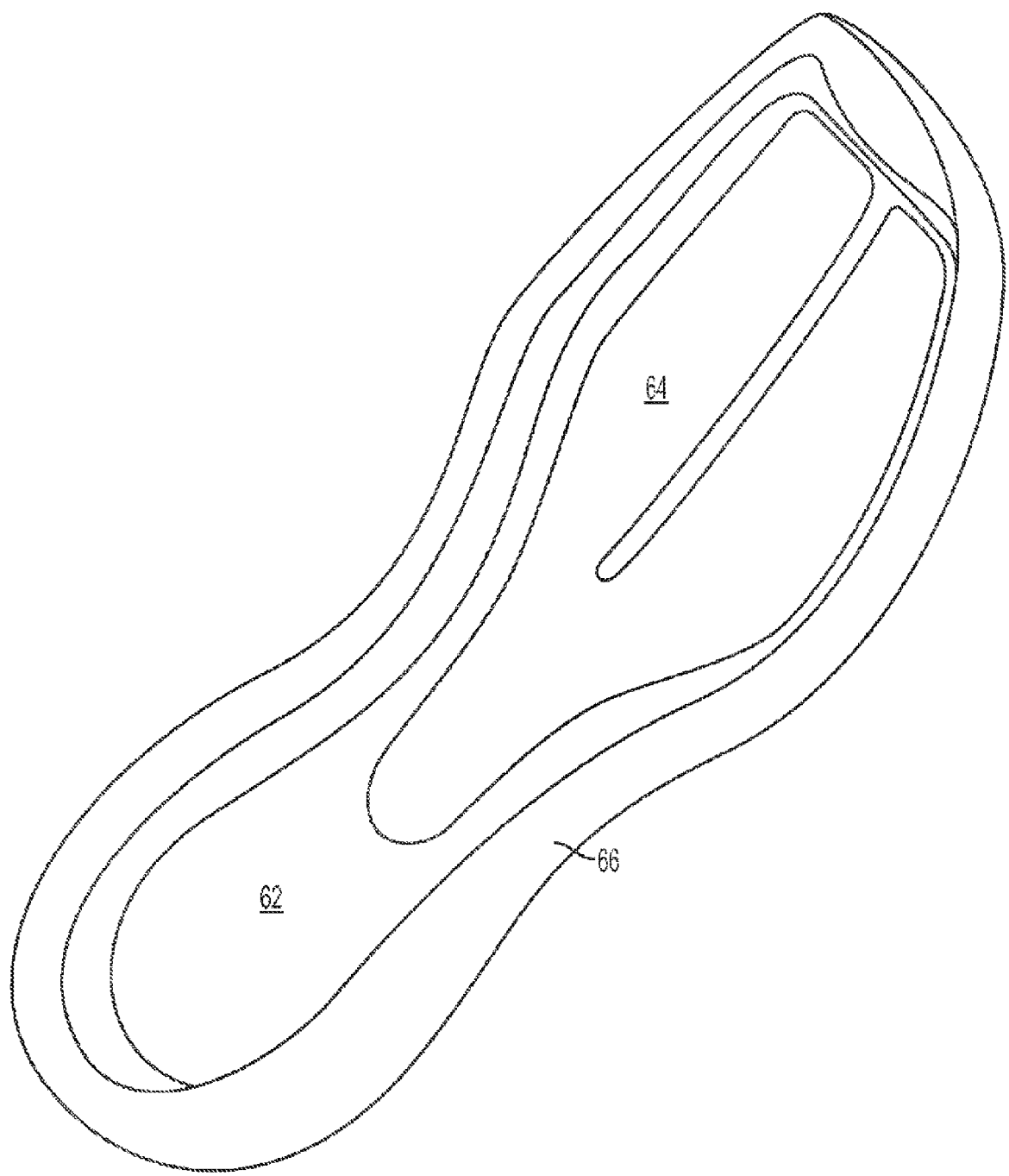
FIG. 5 is a top view of the insert of FIG. 4 inserted in a first portion to form a sole component.

FIGS. 4 and 5 show bottom and top views of an insert 60 which can be used in a sole component as described herein. Insert 60 is similar to insert 36, but as illustrated in FIGS. 4 and 5, insert 60 is formed of two types of materials 62 and 64, where at least one of the materials is an ionomer foam as disclosed herein. FIG. 4 shows a bottom view of insert 60, while FIG. 5 shows a top view of insert 60 formed of two types of materials 62 and 64, with the insert placed inside a first portion 66 to form a sole component 14. Inserts with more than two types of materials, at least one of which is an ionomer foam as disclosed herein, can also be used. In the example illustrated in FIGS. 4 and 5, a portion of a first material 62 can be used in the heel region of the insert, and a portion of a second material 64 can be used in the toe region of the insert. A higher specific gravity material can be used to support the heel region, while a lower specific gravity material can be used to support the toe region. For example, the specific gravity of the first material can be at least 0.02 greater than the specific gravity of the second material. The shape of the portions of the two materials 62 and 64 of the insert can be any suitable shape. For example, the heel region can be in the shape of a wedge. Inserts formed of two types of materials can be useful in running shoes, as well as in basketball shoes.

In some aspects, the article can be something other than a sole component. For example, the article can be an upper or an upper component. An upper component refers toto a piece that is stitched or otherwise joined with one or more other pieces to form an upper. The materials in the upper generally contribute to characteristics such as breathability, conformability, weight, and suppleness or softness. A lower component refers to a piece that is joined with one or more other pieces to form the lower portion of an article of footwear. The lower can include, for example, the outsole and midsole. The choice of outsole materials and design will contribute, for instance, to the durability, traction, as well as to the pressure distribution during use. The midsole materials and design contribute to factors such as the cushioning and support. Grindery components include all of the additional components that can be attached to the upper, lower, or both. Grindery components can include, for example, eyelets, toe puffs, shanks, nails, laces, velcro, catches, backers, linings, padding, heel backings, heel foxings, toe caps, etc.

In some aspects, the upper is a lasted upper. A "lasted upper," as used herein, refers to an upper that is formed into the shoe shape prior to attachment to the sole by one or more mechanical means. The lasted upper can include a heel counter formed to shape the heel of the upper. The lasted upper can include a strobel or a strobel board attached to the upper, typically via a strobel stitch.

While the ionomer foams described herein can be used for making any of a variety of components, including a variety of components for an article of footwear, in particular aspects the components include a midsole, an outsole, an insole, or an insert. Additional articles can include a tongue padding, a collar padding, and a combination thereof. As described above and detailed more completely below, the articles comprising the ionomer foams described herein can exhibit a unique balance of beneficial physical properties such as high energy return, high split tear, low specific gravity, and low compression. Furthermore, the ionomer foam can also be reprocessed with minimal loss in physical properties (e.g., for recycling), providing a solution for materials sustainability.

In the articles comprising the ionomer foam described herein, the ionomer foam portion of the article can exhibit a beneficial split tear, for example a high split tear for a sole component in an article of footwear. In some aspects, the ionomer foam can have a split tear value of about 1.0 kilogram/centimeter (kg/cm) to 4.5 kg/cm, about 1.6 kg/cm to 4.0 kg/cm, about 2.0 kg/cm to 4.0 kg/cm, about 2.0 kg/cm to 3.5 kg/cm, or about 2.5 kg/cm to 3.5 kg/cm. The split tear can be measured pursuant to ASTM D3574-95. In some aspects, the ionomer foam is injection molded (i.e., is not exposed to a separate compression molding step after being formed by injection molding and removed from the injection mold), or is injection molded and subsequently compression molded in a separate compression mold having different dimensions than the mold used in the injection molding step. The ionomer foam can have a split tear of about 0.08 kg/cm to 4.0 kg/cm, about 0.9 kg/cm to 3.0 kg/cm, about 1.0 to 2.0 kg/cm, about 1.0 kg/cm to 1.5 kg/cm, or about 2 kg/cm. In some aspects, the ionomer foam the ionomer foam is injection molded, and has have a split tear of about 0.07 kg/cm to 2.0 kg/cm, or about 0.8 kg/cm to 1.5 kg/cm, or about 0.9 to 1.2 kg/cm, about 1.5 kg/cm to 2.2 kg/cm.

In some aspects, the ionomer foam portion of the article or component of an article can have a stiffness of about 30 Newtons per millimeter (N/mm) to 275 N/mm, about 40 N/mm to 275 N/mm, about 40 N/mm to 100 N/mm, about 100 N/mm to 200 N/mm, about 50 N/mm to 150 N/mm, about 50 N/m to 100 N/mm, or about 50 N/mm to 85 N/mm. In some aspects, the ionomer foam article or article component is formed by injection molding, or by injection molding and subsequently compression molding. The ionomer foam can have a stiffness of about 30 N/mm to 275 N/mm, about 40 N/mm to 275 N/mm, about 40 N/mm to 100 N/mm, about 100 N/mm to 200 N/mm, about 50 N/mm to 150 N/mm, about 50 N/m to 100 N/mm, or about 50 N/mm to 85 N/mm.

The energy return, a measure of the percentage of energy the ionomer foam portion of the article or component returns when it is released after being compressed under load, can provide improved performance for athletic shoes, e.g. for reducing energy loss or dissipation when running. This is especially true for running and other athletic shoes. In some aspects, the ionomer foam portion of the articles and components provided herein have an energy return of about 50% to 95%, about 60% to 95%, about 60% to 90%, about 60% to 85%, about 65% to 85%, or about 70% to 85%. In some aspects, the ionomer foam is injection molded or is injection molded and subsequently compression molded. The ionomer foam of the present disclosure can have an energy return of about 50% to 95%, about 60% to 95%, about 60% to 95% (e.g., about 60% to 85%; about 65% to 80%; about 65% to 75%; about 70% to 80%; or about 75% to 80%; about 75% to 85%, about 75% to 90%, about 80% to 95%; or about 85% to 95%). The energy return can be measured as described in the examples below.

As discussed above, the ionomer foam of the present disclosure exhibits a low specific gravity, which beneficially reduces the weight of midsoles or other components containing the ionomer foam. In some aspects, the ionomer foam, including ionomer foam present in midsoles and midsole components, can have a specific gravity of about 0.05 to 0.25, about 0.05 to 0.2, about 0.05 to 0.15, about 0.08 to 0.15, about 0.08 to 0.20, about 0.08 to 0.25, or about 0.1 to 0.15. In some aspects the ionomer foam has a specific gravity of about 0.15 to 0.3, about 0.2 to 0.35, or about 0.15 to 0.25.

Several methods of measuring resiliency and/or energy return of foams exist in the art. One method of measuring resiliency of foams is based on ASTM D 2632-92, which is a test for solid rubber materials. For use with foams, the test sample is prepared as described in ASTM D2632-92, but uses a sample of foam in place of the sample of solid rubber. This test uses a plunger which is dropped from a height onto a test sample while being guided by a vertical rod.

The drop height is divided into 100 equal parts, and the height to which the plunger rebounds is measured using this 100 part scale, to determine the resiliency of the sample. Alternative methods which use a ball of standard weight dropped onto a sample, and which measure the rebound height of the ball to determine the resiliency of the sample can also be used. In some aspects, the resiliency and/or energy return are determined using force/displacement behavior measured using an Instron Electropuls as described in the Examples. For example, an Instron Electropuls E10000 with a stainless steel 45 mm circular cross section impact geometry can be used to evaluate compression at one or more different compression cycles. The compression cycle can include a running compression cycle consisting of samples being compressed under displacement control from 0 Newtons (N) to 300 N and back to 0 N in 180 milliseconds (ms), followed by a pause of 400 ms for a total of ~1.7 Hertz (Hz). A walking compression cycle can consist of samples compressed from 0 N to 144 N and back to 0 N in 600 ms followed by a pause of 400 ms for a total of ~1 Hz. The corresponding force-displacement data provided information about the foam modulus (stiffness), energy return, set, fatigue behavior, etc. over many cycles. Energy input is taken as the integral of the force-displacement curve during compression force loading. Energy output is taken as the integral of the force displacement curve during unloading. Energy return is the integral of the unloading load deflection curve normalized by the integral of loading load deflection curve (energy output)/(energy input), which can also be viewed as the energy efficiency of the foam. Fatigue behavior is judged by changes in the foam displacement at the max load of a cycle. All measured properties: stiffness, energy input, energy output, and fatigue are measured for thousands of cycles for both running and walking compression cycles.

The specific gravity of a foam is also an important physical property to consider when using a foam for in an article of footwear or athletic equipment. The ionomer foams of the present disclosure can have a specific gravity of from about 0.02 to about 0.22, or of from about 0.03 to about 0.12, or of from about 0.04 to about 0.10, or from about 0.11 to about 0.12, or from about 0.10 to about 0.12, from about 0.15 to about 0.2; about 0.15 to about 0.30. Alternatively or in addition, the ionomer foam can have a specific gravity of from 0.01 to 0.10, or of from 0.02 to 0.08, or of from 0.03 to 0.06; 0.08 to 0.15; or from 0.10 to 0.12. For example, the specific gravity of the ionomer foam can be from or from 0.15 to 0.2, or can be from 0.10 to 0.12 The ionomer foam can be injection molded, or can be injection molded and subsequently compression molded.

In particular examples, the resiliency and/or energy return of the subsequently compression molded ionomer foam can be at least at least 6 percentage points, or at least 7 percentage points, or at least 8 percentage points, or at least 9 percentage points, or at least 10 percentage points, or at least 12 percentage points greater than the resiliency and/or energy return of the injection molded ionomer foam which has not subsequently been compression molded, when the compression molded ionomer foam has a resiliency and/or energy return greater than 45%, or greater than 50%, or greater than 55%, or greater than 60%, or greater than 65%, and the compression molded ionomer foam can have a specific gravity of from 0.02 to 0.15, or of from 0.03 to 0.12, or of from 0.04 to 0.10 or from 0.11 to 0.12, from 0.15 to 0.2; or 0.15 to 0.30.

The specific gravity of the ionomer foam can be determined by testing at least 3 representative samples taken from a foam sample (e.g., a 2 inch×2 inch sample or a 1 inch×1 inch sample), or at least 3 entire foam articles or components. Using a balance with appropriate accuracy for the weight of the sample, the weight of each sample is determined both in air and when the sample is completely submerged in distilled water at a temperature of 22 degrees Celsius (° C.)±2° C., after removing any air bubbles adhered to the surface of the foam sample weighing. The specific gravity (S.G.) is then calculated by taking the weight of the sample in water and subtracting that from the weight of the sample in air, and this value is then divided into the weight of the sample in air, where all the weights are weights in grams.

Compression set of a foam is another important physical property for a foam used as a component of an article of footwear or athletic equipment. In accordance with the present disclosure, the ionomer foam can have a compression set of from 40% to 100%. For example, the compression set can be from 45% to 90%, or from 40% to 80%, or from 50% to 75%.

Compression set can be measured by preparing a sample of a standard thickness (e.g., 10 millimeters (mm)) of a foam. Components having a thickness less than the standard can be stacked to make a sample having the standard thickness. The sample is loaded into a metal compression plate and compressed to a height of 50% of the original thickness (e.g., 5 mm). The sample is placed in a 50° C. oven on its side for 6 hours. At the end of the 6 hours, the sample is removed from the oven and from the metal compression plate, and allowed to cool for 30 minutes. Once cooled, the thickness of the sample is measured. The percent compression set (C.S.) is calculated by (a) subtracting the final sample thickness from the original sample thickness, and (b) subtracting the 50% compressed thickness from the original sample thickness, (c) dividing (a) by (b), and (d) multiplying the result by 100 to obtain the percent compression set (where all thicknesses are measured in millimeters).

Split tear for foams can be measured using ASTM D3574-95. Although this method is directed to bonded and molded urethane foams, it can be used on ionomer foam in accordance with the present disclosure. A sample of ionomer foam having a thickness of 10 mm±1 mm. If the ionomer foam has an outer skin, the outer skin should not be present on the test sample. A 3 cm long cut is placed in the center of one end of the specimen, and marked in five successive 2 cm portions along the edge of the sample. The sample is tested as described in ASTM D3574-95. The tear strength of the ionomer foam can range from 4 kilograms per centimeter (kg/cm) to 10 kg/cm.

The tensile strength of the foam is another important physical characteristic. The ionomer foam can have a tensile strength of from 5 kilograms per cubic centimeter (kg/cm$^2$) to 25 kg/cm$^2$, or of from 10 kg/cm$^2$ to 23 kg/cm$^2$, or of from 15 kg/cm$^2$ to 22 kg/cm$^2$. The tensile strength can be measured on a die cut sample of the foam in the shape of a dumbbell of a standard size such as a 2.5 cm in width by 11.5 cm in length, with a minimum thickness of 3 to 4 mm. The dumbbell follows the shape described in ASTM D412, die C. The sample is loaded symmetrically into and tested using a long travel extensometer such as the Instron 2603-080 which allows for a minimum of 1000% strain with a gauge length of 25 mm and a resolution of at least 0.1 mm. The tensile value at the failure point of the sample (the point during testing when the load value initially drops) is recorded.

Another physical property to consider when determining whether or not a foam is suitable for an intended use, for example for an intended use in an article of footwear or athletic equipment, is its 300% elongation. The ionomer foam can have an elongation of at least 125 kg/cm$^2$, or at least 150 kg/cm$^2$.

Ionic foams described herein can be made by a process/method including receiving a composition described herein, and physically foaming the composition to form an ionomer foam having a specific gravity of about 0.7 or less, or 0.5 or less, or 0.4 or less, or 0.3 or less. The process can include blowing the composition to produce an article or component comprising the ionomer foam. In some examples, the process for forming the ionomer foam comprises injection molding a mixture including a composition as described herein and a supercritical fluid (e.g., supercritical $CO_2$ or supercritical $N_2$) in a mold, and removing the ionomer foam from the mold.

In some examples, the composition can be prepared by methods known in the art, including using a suitable twin-screw extruder. An extruder (e.g., single or twin screw) can be used to provide a composition. The extruder can have a motor to turn a screw inside the extruder. Extruder may be a single screw or twin screws made of individual elements of various sizes and pitches appropriate for mixing or kneading the specific materials used. In some examples, the extruder has a twin screw.

The various components that make up the compositions used to form the ionomer foam of the various examples described herein are added into the extruder through one or more port. The various components can be added as a melt or as appropriately-sized solid particles, for example chips or pellets, that are melted in section as they are mixed in the barrel of the extruder. The contents of the extruder can be heated to melt the composition. A supercritical fluid can be added into the melt as a physical blowing agent. In particular examples, the ionomer foam is prepared by using a physical blowing agent which foams the composition after it exits the extruder, and the ionomer foam is thus substantially free of a chemical blowing agent or decomposition product thereof.

In some examples, the compositions can be added as a melt at a temperature close to or at a temperature that causes ionic crosslinks between polymer chains to dissociate. At lower temperatures the ionic moieties can reform or reassociate. Due to the ionic crosslinking, the extent to which the compositions are crosslinked during processing can be controlled by controlling the temperature; by causing a temperature reduction at a desired point to increase crosslinking, which results in an increase in the modulus or viscosity of the molten resin as the ionic moieties reassociate.

If a chemical blowing agent is used, the processing (melting) temperature used can be sufficiently below the temperature that would trigger the blowing agent. In order to foam the composition, the temperature near the exit of the extruder can be increased to a temperature close to or at the triggering temperature of a chemical blowing agent, thereby producing a chemically foamed ionomer foam as the composition exits the extruder (e.g., as the composition is injected into an injection mold).

Alternatively or in addition, a physical blowing agent can be used for foam the composition to form a physically foamed ionomer foam, or a physically and chemically foamed ionomer foam. For example, a supercritical fluid such as supercritical $CO_2$ or supercritical $N_2$ can be mixed with the molten polymeric composition in the barrel of the extruder. As the mixture of the molten composition comprising one or more ionomeric copolymers and a supercritical fluid exits the extruder, the pressure drop between the higher pressure in the extruder and the lower pressure outside the extruder causes the supercritical fluid to transition to the gas phase and foam the molten polymeric composition.

In some examples, the ionomeric copolymer component of the ionomer foam can form phase separated domains. For example, less polar or nonpolar olefinic repeat units of the ionomeric copolymer can phase separate into primarily olefin-rich domains. The more polar cations can phase separate into cation-rich domains surrounded by domains rich in the acid groups from the ionomeric copolymer, wherein the anionic portions in the acid groups are ionically crosslinked by the cations.

Various examples include methods of manufacturing an article of footwear or components for an article of footwear. In some examples, the methods of manufacturing an article of footwear include injection molding a composition to form an ionomer foam described herein to produce a foam article or component of an article, such as an article of footwear. The article or component of an article can be a midsole or a component of a midsole, and the method can include providing an upper and an outsole for an article of footwear; and combining the midsole or midsole component, the upper, and the outsole to make an article of footwear. In some examples, the method of manufacturing the article of footwear includes combining an article comprising an ionomer foam, an upper, and an outsole to make an article of footwear.

The articles or components of articles such as midsoles, midsole components, inserts and insert components can be prepared by injection molding a melt composition described herein using a physical blowing agent. The injection molding can use a screw-type injector that allows for maintaining and controlling the pressure in the injector barrel. The injection molding machine can allow metering and delivering a supercritical fluid such as $CO_2$ or $N_2$ into the composition prior to injection. The supercritical fluid can be mixed into the composition within the injection barrel and then injected into the mold. The supercritical fluid can then expand to create cell nuclei to form the physical foam within the mold. The injection molding can include physical foaming of the compositions described herein using a microcellular foam injection molding process, such as, for example the MUCELL process (Trexcel Inc., Royal Oak. Mich., USA).

In some examples, the ionomer foams of the various examples described herein are made using a process that involves impregnating a polymeric composition (e.g., at or above a softening temperature of the composition) with a physical blowing agent at a first concentration or first pressure. As used herein, the term "impregnating" generally means dissolving or suspending a physical blowing agent in a composition. The impregnated composition can then be foamed, or can be cooled (when applicable) and re-softened (when applicable) for blowing at a later time.

In some instances, the impregnated composition is foamed by reducing the solubility of the physical blowing agent in the polymer matrix through pressure or temperature changes. The reduction in solubility of the physical blowing agent can release additional amounts (e.g., to create a secondary expansion of an originally-formed microcell in the composition) of the impregnated physical blowing agent from the composition, to further blow the composition, forming a foam composition (e.g., a foam composition having a closed-cell structure).

In addition to injection molding, the ionomer foam of the present disclosure can be foamed and molded using various processes known in the art. For example, the ionomer foam can be formed into slab foam, filament or strand foams, particulate (e.g., bead) foams of various shapes and sizes, etc. These various forms of foam can then be used in different ways. For example, like injection molded foam, slab foam and filament or strand foam can be used directly as a finished foam article, or can be shaped (e.g., cut, buffed, or trimmed) to form a finished foam article, or can be compression molded to form a finished foam article. Optionally, the ionomer foam can be subjected to annealing processes as part of forming the finished foam article. Pellets of the compositions can be used to form individual particulate ionomer foams, or can be foamed and molded to form unitary molded foam articles composed of individual portions of foam affixed to each other.

The ionomer foams of the various examples described herein may be further shaped or molded by any of the methods known for forming articles from thermoplastic materials. Optionally, the ionomer foams of the present disclosure which have been foamed using any suitable blowing process (e.g., blowing using a physical and/or chemical blowing agent), including by injection molding using only a physical blowing agent, can then be compression molded to form a compression molded foam.

In some examples, the ionomer foam of the present disclosure can be prepared by a process comprising (i) softening a composition (e.g., by heating at a first temperature at or above a softening temperature of the composition); (ii) simultaneously or sequentially with the softening (when applicable), contacting the composition with a first concentration or first pressure of a physical blowing agent sufficient to drive an amount of the physical blowing agent into the composition or combine the physical blowing agent with the composition; (iii) changing the concentration or pressure (e.g., decreasing the pressure or concentration) of the physical blowing agent to a second concentration or second pressure that is effective to foam the composition, thereby forming an ionomer foam (e.g., an ionomer foam having a closed-cell structure); and, (iv) following the changing, cooling (when applicable) the ionomer foam to (e.g., cooling to a temperature below the softening temperature of the composition), to form a solidified ionomer foam.

In other examples, the ionomer foam of the present disclosure is prepared by (i) contacting (e.g., dissolving or suspending) the composition with a first concentration of a chemical blowing agent, in some examples, at or above a softening temperature of the composition (ii) triggering the chemical blowing agent to foam the composition, thereby forming an ionomer foam (e.g., an ionomer foam having a closed-cell structure); and, (iii) following the triggering, in some examples, cooling the ionomer foam to, e.g., a temperature below its softening temperature, to form a solidified ionomer foam. In some examples, the "triggering" of the chemical blowing agent is performed by any suitable method, including heating the composition comprising a concentration of the chemical blowing agent to a temperature sufficient to "trigger" the chemical blowing agent, wherein the concentration of the chemical blowing agent is effective to foam the composition, thereby forming an ionomer foam (e.g., an ionomer foam having a closed-cell structure).

In some examples, the contacting comprises contacting at a pressure of from about 10 MPa to about 100 MPa (e.g., from about 30 MPa to about 100 MPa, about 20 MPa to about 80 MPa, about 30 MPa to about 60 MPa or about 40 MPa to about 70 MPa).

In some aspects, the present disclosure is directed to a compression molded ionomer foam, and to a method of forming compression molded ionomer foam for, among other applications, articles of footwear or athletic equipment. In some examples, the method can be a process comprising providing (e.g., preparing) an ionomer foam preform and then compression molding the ionomer foam preform to form a compression molded ionomer foam. For example, the ionomer foam can be compression molded by placing the ionomer foam preform in a compression mold having a height less than the initial height of the ionomer foam preform and closing the mold, thereby compressing the ionomer foam preform to the height of the mold. Simultaneously or sequentially with the compressing, the ionomer foam preform can be heated in the closed compression mold. During the compression molding, the temperature of at least a portion of the ionomer foam preform in the closed mold can be raised to a temperature within ±30° C. of the softening temperature of the composition. The temperature can be raised by heating the closed mold. Following the raising of the temperature, while the ionomer foam preform remains closed in the compression mold, the temperature of at least a portion of the ionomer foam preform can be lowered. The temperature can be lowered by cooling the closed mold. The lowering can lower the temperature of at least a portion of the ionomer foam preform to a temperature at least 35° C. below the softening temperature of the composition, thereby forming the compression molded ionomer foam. Following the cooling, the compression mold can be opened, and the compression molded ionomer foam can be removed from the compression mold.

Examples contemplated herein are directed to methods of manufacturing articles of footwear or athletic equipment. For example, the method can comprise providing components such as midsoles and inserts of an article of footwear in accordance with the present disclosure, and combining the component with a footwear upper and an outsole to form the article of footwear.

One method of making compression molded ionomer foam articles such as midsoles and inserts or components of articles such as components of midsoles or components of inserts described herein comprises forming an ionomer foam preform and compression molding the ionomer foam preform to make a compression molded ionomer foam. In some examples, the foam preforms of the various examples described herein are obtained by blowing the composition by about 150% to about 240% (e.g., from about 150% to about 220%; about 150% to about 200%, about 175% to about 225%, about 180% to about 230% or about 160% to about 240%) in at least one dimension (e.g., the vertical dimension) using a blowing agent. In some examples, the blown composition can be compression molded to about 120% to about 200% (e.g., from about 120% to about 180%; about 130% to about 190%; about 150% to about 200%; or about 160% to about 190%) in at least one dimension.

Thus for example, if the foaming of the composition is about 200%, the blown composition can be compression molded by a net 20% by compression molding to about 180%. In another example, if the composition is blown into a 20 mm (height)×10 cm (width)×5 cm (depth) slab, and the slab is compression molded in the height direction by 20%, the compression molded slab would have the dimensions 18 mm (height)×10 cm (width)×5 cm (depth). In some examples, the compression molding is substantially maintained.

In some examples, the ionomer foam is made using a process that involves impregnating a composition (e.g., at or above a softening temperature of the composition) with a physical blowing agent at a first concentration or first pressure. The impregnated composition can then be foamed, or can be cooled (when applicable) and re-softened (when applicable) for blowing at a later time. In some instances, the impregnated composition is foamed by reducing the temperature or pressure, impacting the solubility of the physical blowing agent. The reduction in solubility of the physical blowing agent can release additional amounts of the impregnated physical blowing agent from the composition to further blow the composition forming an ionomer foam (e.g., an ionomer foam having a closed-cell structure).

In some examples, the compression molding process is conducted by heating the ionomer foam preform in a closed compression mold. The ionomer foam preform is heated to a temperature close to its softening temperature, to allow the foam to retain the shape of the compression mold. For example, the foam preform can be heated to a temperature within plus or minus (±) 30° C. of its softening temperature, or within ±20° C. of its softening temperature, or within ±10° C. of its softening temperature, or within ±5° C. of its softening temperature. For example, the ionomer foam preform can be heated to a temperature of from about 100° C. to about 250° C., or of from about 140° C. to about 220° C., or of from about 100° C. to about 150° C., or of from about 130° C. to about 150° C.

The material used to form the compression mold can be any material which can withstand the temperatures used during the process, such as machined metals, including aluminum. The compression mold can be made using two pieces, such as a top and a bottom mold. Depending on the shape of the foam component to be molded, a multiple-piece mold may be used in order to more easily release the compression molded foam from the mold.

The injection molded ionomer foam can have a closed skin. A closed skin can also be formed by compression molding an ionomer foam preform in a compression mold. However, care should be taken during the compression molding not to subject the ionomer foam preform to conditions such that more than a desired amount of the closed cell structures of the foam collapse. One way to avoid collapsing more than a desired amount of the closed cell structures is to control the temperature of the ionomer foam during the compression molding process, for example, by controlling the temperature of the mold. For example, during the compression molding step, the heating of the ionomer foam preform in the compression mold can be conducted for time of from 100 seconds to 1,000 seconds, or of from 150 seconds to 700 seconds.

Once the ionomer foam has been heated in the compression mold at the appropriate temperature for the desired length of time to soften the ionomer foam to the desired level, the softened preform is cooled, for example, to a temperature at least 35° C. below its softening temperature, or at least 50° C. below its softening temperature, or at least 80° C. below its softening temperature, to re-solidify the softened foam, thereby forming the compression molded foam. Once cooled, the compression molded ionomer foam is removed from the compression mold. Following the heating, the cooling of the foam preform in the compression mold can be conducted for a time of from 50 to 1,000 seconds, or for a time of from 100 to 400 seconds.

In the ionomer foam of the present disclosure, the composition comprising one or more ionomeric copolymers has a foam structure with a specific gravity of about 0.7, 0.5, 0.4, 0.3, or less. The the ionomer foam has a specific gravity of about 0.1 to about 0.22, about 0.2 to about 0.35, or about 0.1 to about 0.35. The ionomer foam can be foamed using any one of the methods described above. The ionomer foam can be included in components of articles of footwear as described above, for example a sole component as depicted in FIG. 1.

The compositions provided herein can include one or more ionomeric polymers. The ionomeric polymers can include chain units derived from one or more olefins and chain units derived from one or more ethylenically-unsaturated acid groups. The compositions can also include a plurality of cations ionically crosslink anionic form of the acid groups in the ionomeric copolymers. In some aspects, the compositions are essentially just the ionomeric copolymers and metal cations. The ionomeric copolymers can have a melt flow index of about 30 or less, about 20 or less, about 15 or less, about 10 or less, or about 5 or less.

A variety of ionomeric copolymers can be processed as described herein to have a foam structure. In some aspects, the ionomeric copolymers are terpolymers of ethylene, acrylic acid, and methyl acrylate or butyl acrylate. In some aspects, a ratio III of a total parts by weight of the acrylic acid in the ionomeric copolymers to a total weight of the ionomeric copolymers is about 0.05 to about 0.6, about 0.1 to about 0.6, about 0.1 to about 0.5, about 0.15 to about 0.5, or about 0.2 to about 0.5.

In some aspects, the ionomeric copolymers have a plurality of a first repeat unit having a formula according to Formula I and a plurality of a second repeat unit having a formula according to Formula II, and a plurality of cations, wherein each of the cations is crosslinking two or more of the second repeat units.

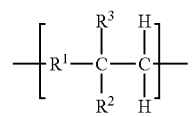

Formula I

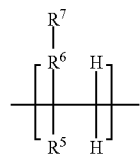

Formula II

Each occurrence of $R^1$ can be independently none, a substituted or unsubstituted $C_1$, $C_2$, $C_3$, $C_4$, $C_5$, $C_6$, $C_7$, or $C_8$ alkyl, or a substituted or unsubstituted $C_2$, $C_3$, $C_4$, $C_5$, $C_6$, $C_7$, or $C_8$ alkenyl. In some aspects, each occurrence of $R^1$ is none.

Each occurrence of $R^2$ can be independently hydrogen, a halogen, a substituted or unsubstituted $C_1$, $C_2$, $C_3$, $C_4$, $C_5$, $C_6$, $C_7$, or $C_8$ alkyl, a substituted or unsubstituted $C_2$, $C_3$, $C_4$, $C_5$, $C_6$, $C_7$, or $C_8$ alkenyl, a substituted or unsubstituted phenyl, a substituted or unsubstituted alkyl-phenyl, a substituted or unsubstituted $C_1$, $C_2$, $C_3$, $C_4$, $C_5$, $C_6$, $C_7$, or $C_8$ alkoxy, or a substituted or unsubstituted $C_3$, $C_4$, $C_5$, $C_6$, $C_7$, or $C_8$, $C_9$, $C_{10}$, $C_{11}$, or $C_{12}$ alkyl ester. In some aspects, each occurrence of $R^2$ is independently a hydrogen, methyl, phenyl, or halogen. In some aspects, each occurrence of $R^2$ is

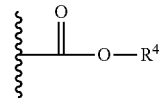

where each occurrence of $R^4$ is independently a hydrogen, a substituted or unsubstituted $C_1$, $C_2$, $C_3$, $C_4$, $C_5$, $C_6$, $C_7$, or $C_8$ alkyl.

Each occurrence of $R^3$ can be independently hydrogen, a substituted or unsubstituted $C_1$, $C_2$, $C_3$, $C_4$, $C_5$, $C_6$, $C_7$, or $C_8$ alkyl, or a substituted or unsubstituted $C_2$, $C_3$, $C_4$, $C_5$, $C_6$, $C_7$, or $C_8$ alkenyl. In some aspects, each occurrence of $R^3$ is independently a hydrogen or methyl.

Each occurrence of $R^5$ can be independently a hydrogen, a halogen, a substituted or unsubstituted $C_1$, $C_2$, $C_3$, $C_4$, $C_5$, $C_6$, $C_7$, or $C_8$ alkyl, a substituted or unsubstituted $C_2$, $C_3$, $C_4$, $C_5$, $C_6$, $C_7$, or $C_8$ alkenyl, a substituted or unsubstituted phenyl, a substituted or unsubstituted alkyl-phenyl, a substituted or unsubstituted $C_1$, $C_2$, $C_3$, $C_4$, $C_5$, $C_6$, $C_7$, or $C_8$ alkoxy, or a substituted or unsubstituted $C_3$, $C_4$, $C_5$, $C_6$, $C_7$, or $C_8$, $C_9$, $C_{10}$, $C_{11}$, or $C_{12}$ alkyl ester. In some aspects, each occurrence of $R^5$ is independently a hydrogen or a methyl.

Each occurrence of $R^6$ can be independently none, a substituted or unsubstituted $C_1$, $C_2$, $C_3$, $C_4$, $C_5$, $C_6$, $C_7$, or $C_8$ alkyl, a substituted or unsubstituted $C_2$, $C_3$, $C_4$, $C_5$, $C_6$, $C_7$, or $C_8$ alkenyl, a substituted or unsubstituted phenyl, a substituted or unsubstituted alkyl-phenyl, or a substituted or unsubstituted $C_1$-$C_8$ alkoxy. In some aspects, each occurrence of $R^6$ is none.

Each occurrence of $R^7$ can be independently a carboxylate, a sulfate, a sulfonate, a nitrate, a phosphate, a phosphonate, or another negatively charged functional group. In some aspects, each occurrence of $R^7$ is a carboxylate. For example, in some aspects, the second repeat unit has a formula according to Formula IIA, where $R^5$ and $R^6$ are as descried above.

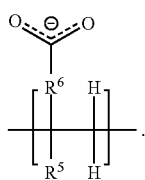

Formula IIA

The compositions can include a plurality of cations ionically crosslinking the ionomeric copolymers. For example, the cations can ionically crosslink anionic groups from acid groups. In some aspects, the cations ionically crosslink units having a structure according to Formula II.

In the compositions described herein, a plurality of cations are present to crosslink negatively charged groups in the ionomeric copolymer. For example, an ionomer having free carboxylate groups can be crosslinked by a plurality of cations. Because the compositions are crosslinked via ionic crosslinking, the compositions are in some aspects free or substantially free of any covalent and irreversible chemical crosslinks, for example the compositions can be free of covalent crosslinking between the ionomeric copolymers. The cations can include cations of alkali metals or alkali earth metals such as a magnesium ion, a sodium ion, a potassium ion, a cesium ion, a calcium ion, a barium ion, a manganese ion, a copper ion, a zinc ion, a tin ion, a lithium ion, and a positively charged compound thereof. In some aspects, the cation is a sodium cation, a lithium cation, a zinc cation, a magnesium cation, or any combination thereof. The cations can include organic cations such as an ammonium ion, a pyridinium ion, a guanidinium ion, an imidazolium ion, a phosphonium ion, or a sulfonium ion.

In some aspects, a ratio II of a total parts by weight of the carboxylic acid groups in the ionomeric copolymers to a total weight of the ionomeric copolymers is about 0.05 to about 0.7, about 0.1 to about 0.6, about 0.2 to about 0.6, or about 0.2 to about 0.5. In some aspects, a ratio II of a total parts by weight of the second repeat units in the ionomeric copolymers to a total weight of the ionomeric copolymers is about 0.1 to about 0.7, about 0.1 to about 0.6, about 0.2 to about 0.6, or about 0.2 to about 0.5.

In some aspects, the composition further includes one or more additional components such as fillers, nucleating agents, or both.

Nucleating agents are widely used to modify the properties of various polymers. Nucleating agents can aid in decreasing foam specific gravity, increasing the number of cells present in the foam, and decreasing cell size in the foam by providing a surface for heterogeneous nucleation of gas bubbles from the supercritical fluid state. For the ionomer foams of the present disclosure, nucleating agents can influence the properties of the final foam article by modifying the quantity, distribution and rate of supercritical fluid conversion from a liquid to a gas during the foaming process as lower pressures. The addition of nucleating agents provides a surface on which the supercritical fluid can be transformed from a liquid to a gas. As a consequence, many nucleation sites will result in many gas cell domains. In a particular example, the nucleating agent can include a metal salt of a fatty acid. In some aspects, the nucleating agent is zinc stearate. In some aspects, the composition contains about 0.1 weight percent (wt %) to about 10 wt. %, about 0.1 wt. % to about 5 wt. %, about 0.1 wt. % to about 2 wt. %, or about 0.5 wt. % to about 2 wt. % of the nucleating agent based upon a total weight of the composition.

In some examples, the composition can also include a nanofiller. Nanofillers can not only serve as mechanical reinforcement but also nucleating agents. A variety of nanofillers can be used in lieu of or in addition to the zinc stearate. Nanofillers can include nanomaterials having one-dimensional structures such as of plates, laminas and/or shells; two-dimensional structures such as nanotubes and nanofibres having a diameter lower than 0.1 μm; or three-dimensional nanostructures such as nanoparticles or beads. Nanoplate fillers can be natural or synthetic clays, as well as phosphates of transition metals. Clay-based nanocomposites generate an overall improvement in physical performances. The most widely used ones are the phyllosilicates. Nanofillers can include nano-oxides such as nanoparticles of Titanium dioxide or Rutile. Other nanofillers can include nanoparticles of alumina or aluminum oxide, diatomite, and nanoscale carbon materials such as single-wall carbon nanotubes (SWCNT) or double-wall carbon nanotubes (DWCNT).

In some aspects, the compositions further include one or more olefinic polymers. Olefinic polymers can include ethylene-based copolymers, propylene-based copolymers, and butene-based copolymers. In some aspects, the olefinic polymer is an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer, any copolymer thereof, and any blend thereof. In some aspects, a ratio V of a total parts by weight of the olefinic polymers present in the composition to a total parts by weight of the ionomeric copolymers in the composition is about 0.0 to about 0.6, about 0.0 to about 0.4, about 0.01 to about 0.4, or about 0.01 to about 0.6, or about 0.1 to about 0.4.

In some aspects, the compositions include an ethylene-vinyl acetate (EVA) copolymer. The ethylene-vinyl acetate (EVA) copolymer can have a range of vinyl acetate contents, for example about 50% to about 90%, about 50% to about 80%, about 5% to about 50%, about 10% to about 45%, about 10% to about 30%, about 30% to about 45%, or about 20% to about 35%.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.4%, 3.2%, and 4.4%) within the indicated range.

The terms "about" and "substantially" are used herein with respect to measurable values and ranges due to expected variations known to those skilled in the art (e.g., limitations and variabilities in measurements).

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of polyethylene; "units of polypropylene" refers to block units of polypropylene; "units of polybutylene" refers to block units of polybutylene, and so on. Such use will be clear from the context.

The term "copolymer" refers to a polymer having two or more monomer species, and includes terpolymers (i.e., copolymers having three monomer species).

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

Unless otherwise specified, temperatures referred to herein are based on atmospheric pressure (i.e. one atmosphere).

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Materials

SURLYN 9320, HPF AD1035, HPF2000, SURLYN 8150, SURLYN 8320, and HPF AD1172 were obtained from DuPont (Wilmington, Del., USA). SURLYN 9320 is a zinc ionomer of ethylene acid acrylate terpolymer. HPF AD1035, HPF AD1172, and HPF2000 are magnesium ionomers of ethylene acid acrylate terpolymer. SURLYN 8150 is a sodium ionomer of ethylene acid copolymer. SURLYN 8320 is a sodium ionomer of ethylene acid acrylate terpolymer.

Solid and Foam Polymer Characterization

Solid

Dynamic scanning calorimetry (DSC) was performed on a TA instruments Q2000. 10-30 mg pieces of undried resin pellets were cycled from −90° C. to 225° C. at 20 degrees Celsius per minute (° C./min) and cooled to −90° C. at 10° C./min. Each material was run in duplicate The $T_m$ and $T_g$ values were recorded from the second cycle.

Dynamic mechanical analysis (DMA) was performed on a TA instruments Q800 (New Castle, Del., USA). Solid 150 mm×100 mm×2 mm (L×W×H) plaques of each material were injected molded. From the injection molded plaques approximately 10 mm×60 mm×2 mm (L×W×H) samples were die cut. Strain and frequency sweeps experiments were run at 25° C. Strain sweep experiments sampled the range from 2×10$^{-4}$ to 2% strain at 1 Hz. Frequencies from 0.5 to 100 Hz were sampled with 10 points per decade for the frequency sweep experiments at 0.1% strain. Temperature sweep experiments were conducted by scanning from −20° C. to 100° C. at 5° C./min with 0.1% strain at 1 Hz. The glass transition temperature, $T_g$, was recorded at the peak of the loss modulus, G" If there is not a peak in G" the peak of tan δ was recorded as the $T_g$. Values for G', G" and tan δ were recorded at 25° C.

Viscosity measurements were collected on a TA instruments DHR-3 Rheometer using flat parallel plates. Samples of 25 mm circular cross section and circle roughly 2 mm thick were die cut from a solid injection molded plaque. The samples were dried before placing in the rheometer. All samples were equilibrated at 180° C. for 2-5 minutes and trimmed to obtain a final gap of <1 mm. A flow sweep experiment with shear rates from 0.01 to 100 reciprocal seconds($s^{-1}$) was conducted. The data was fit with Carreau, Carreau-Yasuda, and Williamson models and the best-fit was selected to record the zero-shear viscosity value.

Foam

The specific gravity (SG) of 10-20 mm foamed plaques was measured using a Densicom Tester (Qualitest, Plantation, Fla., USA). Pre-weighed samples were submerged in a water bath and the ratio of the mass of the sample in air and the mass of the sample in water was used to calculate the specific gravity of the sample.

Water uptake. foamed samples were dried in a vacuum oven at 50° C. for 2 days before being submerged in a water bath for 24 h. The surface water was removed by gently blotting it from the surface of the sample before weighing. The water uptake was calculated as the percent mass difference between the dry and wet samples.

Force/displacement behavior for the foams and the foamed articles was measured using an Instron Electropuls E10000 (Instron, Norwood, Mass., USA) with a stainless steel 45 mm circular cross section impact geometry. Most foam slabs were approximately 10 mm, some were thinner or thicker. Each sample was evaluated by two different compression cycles: "running" and "walking". A "running" compression cycle consists of samples being compressed under displacement control from 0N to 300N and back to 0N in 180 ms, followed by a pause of 400 ms for a total of ~1.7 Hz. The "walking" compression cycle consist of samples compressed from 0N to 144N and back to 0N in 600 ms followed by a pause of 400 ms for a total of ~1 Hz. The corresponding force-displacement data provided information about the foam modulus (stiffness), energy input, energy output, set, fatigue behavior, etc., over many cycles. Typical characterization using the compression sequence above are run for 5000 cycles, which simulates approximately ~5-10 miles of walking/running and takes about 45 minutes of testing time on the Electropuls. Longer runs up to 100,000 compression cycles are done to simulate accelerated materials response to ~100-200 miles of use.

Energy input is taken as the integral of the force-displacement curve during compression force loading. Energy output is taken as the integral of the force displacement curve during unloading. Energy return is the integral of the unloading load deflection curve normalized by the integral of loading load deflection curve (energy output)/(energy input), which can also be viewed as the energy efficiency of the foam. Fatigue behavior is judged by changes in the foam displacement at the max load of a cycle. All measured properties: stiffness, hysteresis, and fatigue are measured for thousands of cycles for both running and walking compression cycles.

Solid and Foam Injection Molding of Virgin and Reprocessed Polymer.

Dried virgin or reprocessed polymer pellets were fed into the hopper of an Arburg 320C injection molding machine equipped with a MUCELL system. The MUCELL system injects supercritical fluid into the polymer melt to create a final article that is physically foamed. That is, foams were created only using the resin, supercritical fluid, and injection machine. Nitrogen ($N_2$) was used predominantly and lead to more consistent samples, but Carbon Dioxide ($CO_2$) was also demonstrated to work successfully to yield physically foamed samples. Solid plaques are made without utilizing the MUCELL process. That is, using conventional injection molding.

Machine: Arburg 320C with 30 mm screw
Supercritical Fluids used: carbon dioxide (CO2) or nitrogen (N2)
Rectangular Mold Geometry: 4"×6" with variable thickness of 2*, 5, 10, 15 or 20 mm. *(2 mm was solid resin, others were foamed)
Shot size (resin mass): varied, but typically 60-80 g
Temperatures:
  1) Hopper/feed zone temperature: 40 C
  2) Barrel Zone 1: 177-210 C
  3) Barrel Zone 2: 177-210 C
  4) Barrel Zone 3: 190-220 C
  5) Barrel Zone 4: 190-220 C
  6) Nozzle temperature: 190-220 C
  7) Mold temperature: 29-49 C (but worked better at higher temps to form thinner skins, but lead to longer cycling time)
Injection speed: 0.7-0.8 in/sec, or a related moderate feed rate
Cooling time in mold: 200-400 s (depending on part width or thickness)
$N_2$ MUCELL Settings
  Supercritical fluid: $N_2$
  Feed pressure: 2500 psi
  Flowrate: 0.4 lb/hr
  Calculated weight percent (wt %) of $N_2$: 0.1%-0.3%
  $N_2$ injection time: 1.7 sec (for 0.1% N2) and 5.1 sec (for 0.3% N2)
$CO_2$ MUCELL Settings:
  1) Supercritical fluid: $CO_2$
  2) Calculated weight percent (wt %) of $CO_2$: 1%-3%
Pressure drop: <250 psi
Twin Screw Compounding of Foams Foam plaques, sprue, and runner pieces of 8320 and HPF2000 were milled in a mechanical grinding process to form moderately fine particlates. The ground polymer particulates were added to the feeder and extruded at temperatures >190° C. Extrudated strands were cooled via waterbath and pelletized with a knife chopper.

The initial extruded pellets were quite small. The small pellets were re-extruded to obtain larger pellets. That is the materials saw two heat histories. The twice extruded pellets were then injection molded with the MUCELL process using identical injection molding process conditions as the virgin resin to create physical foam plaques for evaluation.

Exemplary Data of Foam Plaques

A variety of foam plaques were prepared as described above using either completely virgin resin or including some recycled material prepared as described above. Exemplary data is presented in Table 1.

TABLE 1

Properties of Foam Plaques

| | Article # | | | | | | | | |
|---|---|---|---|---|---|---|---|---|---|
| | Article #1 | Article #2 | Article #3 | Article #4 | Article #5 | Article #6 | Article #7 | Article #8 | Article #9 |
| Resin | 9320 | 9320 | AD1035 | HPF2000 | HPF2000 | 8150 | 8320 | 8320 | AD1172 |
| SuperCriticalFluid | $CO_2$ | $N_2$ | $CO_2$ | $CO_2$ | $N_2$ | $N_2$ | $CO_2$ | $N_2$ | $N_2$ |
| Weight | 67.2 | 69.42 | 79.88 | 71.07 | 81.84 | 74.47 | 84.76 | 79.57 | 68.94 |
| Specific gravity | 0.45 | 0.23 | 0.27 | 0.24 | 0.27 | 0.5 | 0.38 | 0.27 | 0.23 |
| Energy Return (%) | 82 | 68 | 83 | 87 | 87 | | 59 | 61 | 85 |
| Stiffness (N/mm) | 211 | 60 | 110 | 104 | 248 | 1969 | 66 | 102 | 74 |

| | Article # | | | | | |
|---|---|---|---|---|---|---|
| | Article #10 | Article #11 | Article #12 | Article #13 | Article #14 | Article #15 |
| Resin | HPF2000 Reprocessed | HPF2000 | 8320 Reprocessed | AD1172 + EVA40L[a] | AD1035 + EVA40L[a] | HPF2000 + EVA40L[a] |
| SuperCriticalFluid | $N_2$ | $N_2$ | $N_2$ | $N_2$ | $N_2$ | $N_2$ |
| Weight | 71.47 | 61.15 | 63.01 | 83.98 | 83.21 | 78.12 |
| Specific gravity | 0.24 | 0.2 | 0.21 | 0.28 | 0.28 | 0.35 |
| Energy Return (%) | 84 | 86 | 57 | 75 | 76 | 78 |
| Stiffness (N/mm) | 124 | 162 | 65 | 84 | 74 | 210 |

[a]The resin is a blend of 80% ionomer and 20% EVA.

| | Article # | | | |
|---|---|---|---|---|
| | Article #16 | Article #17 | Article #18 | Article #19 |
| Resin | AD1172 + EVA2288[b] | AD1035 + EVA40L[a] | AD1172 + EVA2288[a] | AD1035 |
| SuperCriticalFluid | $N_2$ | $N_2$ | $N_2$ | $N_2$ |
| Weight | 69.81 | 71.63 | 70.8 | 66.19 |
| Specific gravity | 0.31 | 0.32 | 0.31 | 0.22 |
| Energy Retur (%) | 77 | 77 | 79 | 84 |
| Stiffness (N/mm) | 125 | 125 | 144 | 74 |

[a]The resin is a blend of 80% wt ionomer and 20% wt EVA that were melt compounded together on a twin screw extruder
[b]The resin is a blend of 80% wt % ionomer and 20% wt % EVA that were melt compounded together on a twin screw extruder It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The present disclosure will be better understood upon review of the following features, which should not be confused with the claims.

Feature 1. An article comprising a composition, wherein the composition comprises one or more ionomeric copolymers, wherein each of the one or more ionomeric copolymers includes chain units derived from one or more olefins and chain units derived from one or more ethylenically-unsaturated acid groups; and a plurality of cations, wherein the cations ionically crosslink anionic groups from the acid groups in the ionomeric copolymers; wherein the composition has a foam structure having a specific gravity of less than 0.7.

Feature 2. The article according to Feature 1, wherein the composition further comprises a nucleating agent.

Feature 3. The article according to any one of Features 1-2, wherein the nucleating agent comprises a metal salt of a fatty acid.

Feature 4. The article according to any one of Features 1-3, wherein the nucleating agent comprises zinc stearate, or a variety of other ingredients . . . see Kato's responses in her version.

Feature 5. The article according to any one of Features 1-4, wherein the composition comprises from about 0.1 wt. % to about 2 wt. % of the nucleating agent based upon a total weight of the composition.

Feature 6. The article according to any one of Features 1-5, wherein the ionomeric copolymers are terpolymers of ethylene, methyl acrylate, and acrylic acid.

Feature 7. The article according to any one of Features 1-6, wherein a ratio II of a total parts by weight of the carboxylic acid groups in the ionomeric copolymers to a total weight of the ionomeric copolymers is about 0.05 to about 0.6, or about 0.1-0.5.

Feature 8. The article according to any one of Features 1-7, wherein the ionomeric copolymers are copolymers of ethylene, acrylic acid, and an acrylate.

Feature 9. The article according to any one of Features 1-8, wherein a ratio III of a total parts by weight of the acrylic acid in the ionomeric copolymers to a total weight of the ionomeric copolymers is about 0.05 to about 0.6.

Feature 10 The article according to any one of Features 1-9, wherein the acrylate is methyl acrylate or butyl acrylate.

Feature 11. The article according to any one of Features 1-10, wherein a ratio IV of a total parts by weight of the methyl acrylic acid in the ionomeric copolymers to a total weight of the ionomeric copolymers is about 5% to about 20%.

Feature 12. The article according to any one of Features 1-11, wherein the composition further comprises one or more olefinic polymers.

Feature 13. The article according to any one of Features 1-12, wherein each of the one or more olefinic polymers is independently selected from the group consisting of an ethylene-based copolymer, a propylene-based copolymer, and a butene-based copolymer.

Feature 14. The article according to any one of Features 1-13, wherein at least one of the one or more olefinic polymers is an ethylene-based copolymer.

Feature 15. The article according to any one of Features 1-14, wherein the ethylene-based copolymer is selected from the group consisting of a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; an ethylene-octene (POE) copolymer an ethylene-butene (PEB) copolymer, any copolymer thereof, and any blend thereof.

Feature 16. The article according to any one of Features 1-15, wherein the ethylene-based copolymer is an ethylene-vinyl acetate (EVA) copolymer.

Feature 17. The article according to any one of Features 1-16, wherein the ethylene-vinyl acetate (EVA) copolymer has a vinyl acetate content of about 5% to about 50%, about 10% to about 45%, or about 20% to about 30%.

Feature 18. The article according to any one of Features 1-17, wherein a ratio V of a total parts by weight of the olefinic polymers present in the composition to a total parts by weight of the ionomeric copolymers in the composition is about 0.0 to about 0.6, about 0.0 to about 0.4, about 0.01 to about 0.4, or about 0.01 to about 0.6.

Feature 19. The article according to any one of Features 1-18, wherein the ratio V is about 0.1 to about 0.4.

Feature 20. An article comprising a composition, wherein the composition comprises a plurality of ionomeric copolymers, wherein each of the ionomeric copolymers comprises a plurality of a first repeat unit having a formula according to Formula I and a plurality of a second repeat unit having a formula according to Formula II, and a plurality of cations, wherein each of the cations is crosslinking two or more of the second repeat units; wherein each occurrence of $R^1$ is independently none, a substituted or unsubstituted $C_1$-$C_8$ alkyl, or a substituted or unsubstituted $C_2$-$C_8$ alkenyl; wherein each occurrence of $R^2$ is independently hydrogen, a halogen, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, a substituted or unsubstituted $C_1$-$C_8$ alkoxy, or a substituted or unsubstituted $C_3$-$C_{12}$ alkyl ester, wherein each occurrence of $R^3$ is independently hydrogen, a substituted or unsubstituted $C_1$-$C_8$ alkyl, or a substituted or unsubstituted $C_2$-$C_8$ alkenyl; wherein each occurrence of $R^5$ is independently a hydrogen, a halogen, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, a substituted or unsubstituted C1-C8 alkoxy, or a substituted or unsubstituted $C_3$-$C_{12}$ alkyl ester wherein each occurrence of $R^6$ is independently none, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, or a substituted or unsubstituted $C_1$-$C_8$ alkoxy; wherein each occurrence of $R^7$ is independently a carboxylate, a sulfate, a sulfonate, a nitrate, a phosphate, a phosphonate, or another negatively charged functional group; and wherein the composition is a foam having a specific gravity of less than 0.7.

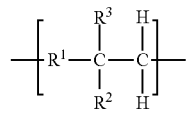

Formula I

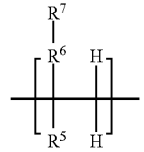

Formula II

Feature 21. The article according to Feature 20, wherein the second repeat unit has a formula according to Formula IIA

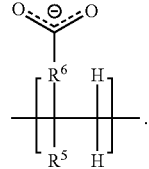

Formula IIA

Feature 22. The article according to any one of Features 20-21, wherein the composition consists essentially of the plurality of ionomeric copolymers and metal cations.

Feature 23. The article according to any one of Features 20-22, wherein each occurrence of $R^1$ is none.

Feature 24. The article according to any one of Features 20-23, wherein each occurrence of $R^2$ is independently a hydrogen, methyl, phenyl, or chloride.

Feature 25. The article according to any one of Features 20-24, wherein each occurrence of $R^2$ is

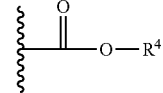

where each occurrence of $R^4$ is independently a hydrogen, a substituted or unsubstituted $C_1$-$C_8$ alkyl.

Feature 26. The article according to any one of Features 20-25, wherein each occurrence of $R^3$ is independently a hydrogen or methyl.

Feature 27. The article according to any one of Features 20-26, wherein each occurrence of $R^5$ is independently a hydrogen or a methyl.

Feature 28. The article according to any one of Features 20-27, wherein each occurrence of $R^6$ is none.

Feature 29. The article according to any one of Features 20-28, wherein each occurrence of $R^7$ is a carboxylate.

Feature 30. The article according to any one of Features 20-29, wherein a ratio II of a total parts by weight of the second repeat unit to a total weight of the ionomeric copolymers is about 0.1 to about 0.6.

Feature 31. The article according to any one of Features 20-30, further comprising a plurality of olefinic polymers.

Feature 32. The article according to any one of Features 20-31, wherein each of the olefinic polymers is independently selected from the group consisting of an ethylene-based copolymer, a propylene-based copolymer, and a butene-based copolymer.

Feature 33. The article according to any one of Features 20-32, wherein each of the olefinic polymers is an ethylene-based copolymer.

Feature 34. The article according to any one of Features 20-33, wherein the ethylene-based copolymer is selected from the group consisting of a styrene-ethylene/butylene-styrene (SEBS) copolymer; an ethylene-propylene diene monomer (EPDM) copolymer; an ethylene-vinyl acetate (EVA) copolymer an ethylene alkyl acrylate (EAA) copolymer, an ethylene alkyl methacrylate (EAMA) copolymer; an ethylene-octene (POE) copolymer an ethylene-butene (PEB) copolymer, any copolymer thereof, and any blend thereof.

Feature 35. The article according to any one of Features 20-34, wherein the ethylene-based copolymer is an ethylene-vinyl acetate (EVA) copolymer.

Feature 36. The article according any one of Features 20-35, wherein the ethylene-vinyl acetate (EVA) copolymer has a vinyl acetate content of about 10% to about 45%.

Feature 37. The article according to any one of Features 20-36, wherein a ratio V of a total parts by weight of the olefinic polymers present in the composition to a total parts by weight of the ionomeric copolymers in the composition is about 0.0 to about 0.6, about 0.0 to about 0.4, about 0.01 to about 0.4, or about 0.01 to about 0.6.

Feature 38. The article according to any one of Features 20-37, wherein the ratio V is about 0.1 to about 0.4.

Feature 39. The article according to any one of Features 1-38, wherein each of the plurality of cations is a metal cation.

Feature 40. The article according to any one of Features 1-39, wherein each of the metal cations is independently selected from the group consisting of a magnesium ion, a sodium ion, a potassium ion, a cesium ion, a calcium ion, a barium ion, a manganese ion, a copper ion, a zinc ion, a tin ion, a lithium ion, an alkali metal, alkali earth metal, or a positively charged compound thereof.

Feature 41. The article according to any one of Features 1-40, wherein each of the plurality of cations is independently selected from the group consisting of a sodium cation, a lithium cation, a zinc cation, a magnesium cation, and any combination thereof.

Feature 42. The article according to any one of Features 1-41, wherein the plurality of cations comprise magnesium cations, zinc cations, sodium cations, and any combination thereof.

Feature 43. The article according to any one of Features 1-42, wherein each of the plurality of cations is an organic cation.

Feature 44. The article according to any one of Features 1-43, wherein each of the organic cations is independently selected from the group consisting of an ammonium ion, a pyridinium ion, a guanidinium ion, an imidazolium ion, a phosphonium ion, and a sulfonium ion.

Feature 45. The article according to any one of Features 1-44, wherein the plurality of ionomeric copolymers have a melt flow index of about 30 or less, about 20 or less, about 15 or less, about 10 or less, or about 5 or less.

Feature 46. The article according to any one of Features 1-45, wherein the plurality of olefinic polymers have a melt flow index of about 0.25-5 or about 0.5-2.5

Feature 47. The article according to any one of Features 1-46, wherein the composition has a specific gravity of about 0.2 to about 0.35.

Feature 48. The article according to any one of Features 1-47, wherein the composition has a specific gravity of about 0.1 to about 0.22.

Feature 49. The article according to any one of Features 1-48, wherein the composition has an energy return of about 50% to about 95%, about 60% to about 95%, or about 60% to about 90%.

Feature 50. The article according to any one of Features 1-49, wherein the composition has an energy return of about 75% to about 90%.

Feature 51. The article according to any one of Features 1-50, wherein the composition has a stiffness of about 30 N/mm to about 275 N/mm, about 40 N/mm to about 275 N/mm, or about 40 N/mm to about 100 N/mm.

Feature 52. The article according to any one of Features 1-51, wherein the composition has a stiffness of about 50 N/mm to about 85 N/mm.

Feature 53. The article according to any one of Features 1-52, wherein the composition is substantially free of a chemical blowing agent or decomposition product thereof.

Feature 54. The article according to any one of Features 1-53, wherein the composition is substantially free of covalent crosslinks between the ionomers.

Feature 55. A method of making an article, the method comprising receiving a composition comprising one or more ionomeric copolymers, wherein each of the one or more ionomeric copolymers includes chain units of one or more olefins and one or more acid groups; and a plurality of cations, wherein the cations ionically crosslink anionic groups in the ionomeric copolymers; and physically foaming the composition, forming a foam having a specific gravity of less than 0.7.

Feature 56. The method according to Feature 55, wherein the composition further comprises a nucleating agent.

Feature 57. The method according to any one of Features 55-56, wherein the nucleating agent comprises a metal salt of a fatty acid.

Feature 58. The method according to any one of Features 55-57, wherein the nucleating agent comprises zinc stearate or other nucleating agents described herein.

Feature 59. The method according to any one of Features 55-58, wherein the composition comprises from about 0.1 wt % to about 10 wt. %, about 0.1 wt. % to about 5 wt. %, about 0.1 wt. % to about 2 wt. %, or about 0.5 wt. % to about 2 wt. % of the nucleating agent based upon a total weight of the composition.

Feature 60. The method according to any one of Features 55-59, wherein the ionomeric copolymers are terpolymers of ethylene, methyl acrylate, and acrylic acid.

Feature 61. The method according any one of Features 55-60, wherein a ratio II of a total parts by weight of the carboxylic acids in the ionomeric copolymers to a total weight of the ionomeric copolymers is about 0.1 to about 0.6.

Feature 62. The method according to any one of Features 55-61, wherein the ionomeric copolymers are copolymers of ethylene and acrylic acid.

Feature 63. The method according to any one of Features 5562, wherein a ratio III of a total parts by weight of the acrylic acid in the ionomeric copolymers to a total weight of the ionomeric copolymers is about 0.05 to about 0.6.

Feature 64 The method according to any one of Features 55-63, wherein the ionomeric copolymers are copolymers of ethylene and methyl acrylic acid.

Feature 65. The method according to any one of Features 55-64, wherein a ratio IV of a total parts by weight of the methyl acrylic acid in the ionomeric copolymers to a total weight of the ionomeric copolymers is about 5% to about 20%.

Feature 66. The method according to any one of Features 55-65, wherein the composition further comprises one or more olefinic polymers.

Feature 67. The method according to any one of Features 55-66, wherein each of the one or more olefinic polymers is independently selected from the group consisting of an ethylene-based copolymer, a propylene-based copolymer, and a butene-based copolymer.

Feature 68. The method according to any one of Features 55-67, wherein at least one of the one or more olefinic polymers is an ethylene-based copolymer.

Feature 69. The method according to any one of Features 55-68, wherein the ethylene-based copolymer is selected from the group consisting of a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; an ethylene-octene (POE) copolymer; an ethylene-butene (PEB) copolymer, any copolymer thereof, and any blend thereof.

Feature 70. The method according to any one of Features 55-69, wherein the ethylene-based copolymer is an ethylene-vinyl acetate (EVA) copolymer.

Feature 71. The method according to any one of Features 55-70, wherein the ethylene-vinyl acetate (EVA) copolymer has a vinyl acetate content of about 10% to about 45%.

Feature 72. The method according to any one of Features 55-71, wherein a ratio V of a total parts by weight of the olefinic polymers present in the composition to a total parts by weight of the ionomeric copolymers in the composition is about 0.0 to about 0.6, about 0.0 to about 0.4, about 0.01 to about 0.4, or about 0.01 to about 0.6.

Feature 73. The method according to any one of Features 55-72, wherein the ratio V is about 0.1 to 0.4.

Feature 74. A method of making an article, the method comprising receiving a composition comprising a plurality of ionomeric copolymers, wherein each of the ionomeric copolymers comprises a plurality of a first repeat unit having a formula according to Formula I and a plurality of a second repeat unit having a formula according to Formula II, and a plurality of cations, wherein each of the cations is crosslinking two or more of the second repeat units; wherein each occurrence of $R^1$ is independently none, a substituted or unsubstituted $C_1$-$C_8$ alkyl, or a substituted or unsubstituted $C_2$-$C_8$ alkenyl; wherein each occurrence of $R^2$ is independently hydrogen, a halogen, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, a substituted or unsubstituted $C_1$-$C_8$ alkoxy, or a substituted or unsubstituted $C_3$-$C_{12}$ alkyl ester; wherein each occurrence of $R^3$ is independently hydrogen, a substituted or unsubstituted $C_1$-$C_8$ alkyl, or a substituted or unsubstituted $C_2$-$C_8$ alkenyl; wherein each occurrence of $R^5$ is independently a hydrogen, a halogen, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, a substituted or unsubstituted C1-C8 alkoxy, or a substituted or unsubstituted $C_3$-$C_{12}$ alkyl ester; wherein each occurrence of $R^6$ is independently none, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, or a substituted or unsubstituted $C_1$-$C_8$ alkoxy; and wherein each occurrence of $R^7$ is independently a carboxylate, a sulfate, a sulfonate, a nitrate, a phosphate, a phosphonate, or another negatively charged functional group; and physically foaming the composition, forming a foam having a specific gravity of less than 0.7.

Formula I

Formula II

Feature 75. The method according to Feature 74, wherein the second repeat unit has a formula according to Formula IIA

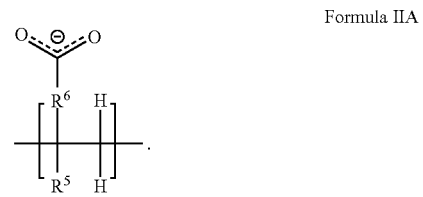

Formula IIA

Feature 76. The method according to any one of Features 74-75, wherein the composition consists essentially of the plurality of ionomeric copolymers and cations.

Feature 77. The method according to any one of Features 74-76, wherein each occurrence of $R^1$ is none.

Feature 78. The method according to any one of Features 74-77, wherein each occurrence of $R^2$ is independently a hydrogen, methyl, phenyl, or chloride.

Feature 79. The method according to any one of Features 74-78, wherein each occurrence of $R^2$ is

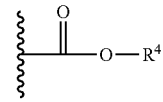

where each occurrence of $R^4$ is independently a hydrogen, a substituted or unsubstituted $C_1$-$C_8$ alkyl.

Feature 80. The method according to any one of Features 74-79, wherein each occurrence of $R^3$ is independently a hydrogen or methyl.

Feature 81. The method according to any one of Features 74-80, wherein each occurrence of $R^5$ is independently a hydrogen or a methyl.

Feature 82. The method according to any one of Features 74-81, wherein each occurrence of $R^6$ is none.

Feature 83. The method according to any one of Features 74-82, wherein each occurrence of $R^7$ is a carboxylate.

Feature 84. The method according to any one of Features 74-83, wherein a ratio II of a total parts by weight of the second repeat unit to a total weight of the ionomeric copolymers is about 0.1 to about 0.6.

Feature 85. The method according to any one of Features 74-84, further comprising a plurality of olefinic polymers.

Feature 86. The method according to any one of Features 74-85, wherein each of the olefinic polymers is independently selected from the group consisting of an ethylene-based copolymer, a propylene-based copolymer, and a butene-based copolymer.

Feature 87. The method according to any one of Features 74-86, wherein each of the olefinic polymers is an ethylene-based copolymer.

Feature 88. The method according to any one of Features 74-87, wherein the ethylene-based copolymer is selected from the group consisting of a styrene-ethylene/butylene-styrene (SEBS) copolymer; an ethylene-propylene diene monomer (EPDM) copolymer; an ethylene-vinyl acetate (EVA) copolymer an ethylene alkyl acrylate (EAA) copolymer; an ethylene alkyl methacrylate (EAMA) copolymer; an ethylene-octene (POE) copolymer an ethylene-butene (PEB) copolymer, any copolymer thereof, and any blend thereof.

Feature 89. The method according to any one of Features 74-88, wherein the ethylene-based copolymer is an ethylene-vinyl acetate (EVA) copolymer.

Feature 90. The method according to any one of Features 74-89, wherein the ethylene-vinyl acetate (EVA) copolymer has a vinyl acetate content of about 10% to about 45%.

Feature 91. The method according to any one of Features 74-90, wherein a ratio V of a total parts by weight of the olefinic polymers present in the composition to a total parts by weight of the ionomeric copolymers in the composition is about 0.0 to about 0.6, about 0.0 to about 0.4, about 0.01 to about 0.4, or about 0.01 to about 0.6.

Feature 92. The method according to any one of Features 74-91, wherein the ratio V is about 0.1 to 0.4.

Feature 93. The method according to any one of Features 55-92, wherein each of the plurality of cations is a metal cation.

Feature 94. The method according to any one of Features 55-93, wherein each of the metal cations independently selected from the group consisting of a magnesium ion, a sodium ion, a potassium ion, a cesium ion, a calcium ion, a barium ion, a manganese ion, a copper ion, a zinc ion, a tin ion, a lithium ion, an alkali metal, alkali earth metal, or a compound thereof.

Feature 95. The method according to any one of Features 55-94, wherein each of the plurality of cations is independently selected from the group consisting of sodium cation, a zinc cation, and a magnesium cation.

Feature 96. The method according to any one of Features 55-95, wherein each of the plurality of cations is an organic cation.

Feature 97. The method according any one of Features 55-96, wherein each of the organic cations is independently selected from the group consisting of an ammonium ion, a pyridinium ion, a guanidinium ion, an imidazolium ion, a phosphonium ion, and a sulfonium ion.

Feature 98. The method according to any one of Features 55-97, wherein the composition has a specific gravity of about 0.2 to about 0.35.

Feature 99. The method according to any one of Features 55-98, wherein the composition has a specific gravity of about 0.1 to about 0.22.

Feature 100. The method according to any one of Features 55-99, wherein the composition has an energy return of about 60% to about 85%.

Feature 101. The method according to any one of Features 55-100, wherein the composition has an energy return of about 75% to about 90%.

Feature 102. The method according to any one of Features 55-101, wherein the composition has a stiffness of about 40 N/mm to about 275 N/mm.

Feature 103. The method according to any one of Features 55-102, wherein the composition has a stiffness of about 50 N/mm to about 85 N/mm.

Feature 104. The method according to any one of Features 55-103, wherein the composition has a change in displacement at max loading of about 0.75 mm or less when measured on foam slabs having a thickness of about 1 cm, wherein the foam slabs are compressed for about 5000 cycles of compression from 0N to 300 N and back to 0 N per cycle, using a 45 mm diameter tupp as the compression head.

Feature 105. The method according to any one of Features 55-104, wherein the composition has a change in displacement at max loading of about 0.1 mm or less when measured on foam slabs having a thickness of about 1 cm, wherein the foam slabs are compressed for about 5000 cycles of compression from 0N to 300 N and back to 0 N per cycle, using a 45 mm diameter tupp as the compression head.

Feature 106. The method according to any one of Features 55-105, wherein the article is substantially free of a chemical blowing agent and decomposition product thereof.

Feature 107. The method according to any one of Features 55-106, wherein the article is substantially free of covalent crosslinks between the ionomers.

Feature 108. A method of forming a foam article, the method comprising forming a melt of a first composition at a first pressure, wherein the first composition comprises one or more ionomeric copolymers, wherein each of the one or more ionomeric copolymers includes chain units of one or more olefins and one or more ethylenically-unsaturated acid groups; a plurality of cations; and a fluid; introducing the melt to a second pressure less than the first pressure, causing a portion of the fluid to leave the melt and forming a foam structure in the melt; and simultaneously with the introducing or sequentially following the introducing, cooling the melt to a temperature below a melting point of the first composition, causing a portion of the plurality of cations to ionically crosslink anionic groups from the acid groups in the ionomeric copolymers, forming the foamed article.

Feature 109. The method according to Feature 108, wherein the introducing comprises extruding the solution through a die, and the foamed article is a strand of extruded foam.

Feature 110. The method according to any one of Features 108-109, wherein the introducing comprises injecting the solution into a mold, and the foamed article is an injection molded foamed article.

Feature 111. The method according to any one of Features 108-110, wherein the first composition further comprises a nucleating agent.

Feature 112. The method according to any one of Features 108-111, wherein the nucleating agent comprises a metal salt of a fatty acid.

Feature 113. The method according to any one of Features 108-112, wherein the nucleating agent comprises zinc stearate or other nucleating agents described herein.

Feature 114. The method according to any one of Features 108-113, wherein the first composition comprises from about 0.1 wt. % to about 2 wt. % of the nucleating agent based upon a total weight of the composition.

Feature 115. The method according to any one of Features 108-114, wherein the ionomeric copolymers are terpolymers of ethylene, methyl acrylic acid, and acrylic acid.

Feature 116. The method according to any one of Features 108-115, wherein a ratio II of a total parts by weight of the acid groups in the ionomeric copolymers to a total weight of the ionomeric copolymers is about 0.1 to about 0.6.

Feature 117. The method according to any one of Features 108-116, wherein the ionomeric copolymers are copolymers of ethylene and acrylic acid.

Feature 118. The method according to any one of Features 108-117, wherein a ratio III of a total parts by weight of the acrylic acid in the ionomeric copolymers to a total weight of the ionomeric copolymers is about 0.05 to about 0.6.

Feature 119 The method according to any one of Features 108-118, wherein the ionomeric copolymers are copolymers of ethylene and methyl acrylic acid.

Feature 120. The method according to any one of Features 108-119, wherein a ratio IV of a total parts by weight of the methyl acrylic acid in the ionomeric copolymers to a total weight of the ionomeric copolymers is about 5% to about 20%.

Feature 121. The method according to any one of Features 108-120, wherein the first composition comprises one or more olefinic polymers.

Feature 122. The method according to any one of Features 108-121, wherein each of the one or more olefinic polymers is independently selected from the group consisting of an ethylene-based copolymer, a propylene-based copolymer, and a butene-based copolymer.

Feature 123. The method according to any one of Features 108-122, wherein at least one of the one or more olefinic polymers is an ethylene-based copolymer.

Feature 124. The method according to any one of Features 108-123, wherein the ethylene-based copolymer is selected from the group consisting of a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; an ethylene-octene (POE) copolymer; an ethylene-butene (PEB) copolymer, any copolymer thereof, and any blend thereof.

Feature 125. The method according to any one of Features 108-124, wherein the ethylene-based copolymer is an ethylene-vinyl acetate (EVA) copolymer.

Feature 126. The method according to any one of Features 108-125, wherein the ethylene-vinyl acetate (EVA) copolymer has a vinyl acetate content of about 10% to about 45%.

Feature 127. The method according to any one of Features 108-126, wherein a ratio V of a total parts by weight of the olefinic polymers present in the first composition to a total parts by weight of the ionomeric copolymers present in the first composition is about 0.0 to about 0.6, about 0.0 to about 0.4, about 0.01 to about 0.4, or about 0.01 to about 0.6.

Feature 128. The method according to any one of Features 108-127, wherein the ratio V is about 0.1 to about 0.4.

Feature 129. A method of forming a foam article, the method comprising forming a melt of a first composition at a first pressure, wherein the first composition comprises a plurality of ionomeric copolymers, wherein each of the ionomeric copolymers comprises a plurality of a first repeat unit having a formula according to Formula I and a plurality of a second repeat unit having a formula according to Formula II, and a plurality of cations, and a fluid; introducing the melt to a second pressure less than the first pressure, causing a portion of the fluid to leave the melt and forming a foam structure in the melt; and simultaneously with the introducing or sequentially following the introducing, cooling the melt to a temperature below a melting point of the first composition, causing a portion of the plurality of cations to ionically crosslink two or more of the second repeat units, forming the foamed article.

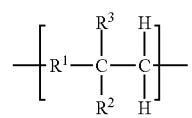

Formula I

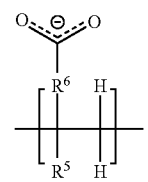

Formula II

Feature 130. The method according to Feature 129, wherein the first composition consists essentially of the plurality of ionomeric copolymers and metal cations.

Feature 131. The method according to any one of Features 129-130, wherein each occurrence of $R^1$ is none.

Feature 132. The method according to any one of Features 129-131, wherein each occurrence of $R^2$ is independently a hydrogen, methyl, phenyl, or halogen.

Feature 133. The method according to any one of Features 129-132, wherein each occurrence of $R^2$ is

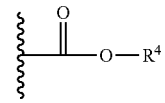

where each occurrence of $R^4$ is independently a hydrogen, a substituted or unsubstituted $C_1$-$C_8$ alkyl.

Feature 134. The method according to any one of Features 129-133, wherein each occurrence of $R^3$ is independently a hydrogen or methyl.

Feature 135. The method according to any one of Features 129-134, wherein each occurrence of $R^5$ is independently a hydrogen or a methyl.

Feature 136. The method according to any one of Features 129-135, wherein each occurrence of $R^6$ is none.

Feature 137. The method according to any one of Features 129-136, wherein each occurrence of $R^7$ is a carboxylate.

Feature 138. The method according to any one of Features 129-137, wherein a ratio II of a total parts by weight of the second repeat unit to a total weight of the ionomeric copolymers is about 0.1 to about 0.6.

Feature 139. The method according to any one of Features 129-138, wherein the first composition comprises a plurality of olefinic polymers.

Feature 140. The method according to any one of Features 129-139, wherein each of the olefinic polymers is independently selected from the group consisting of an ethylene-based copolymer, a propylene-based copolymer, and a butene-based copolymer.

Feature 141. The method according to any one of Features 129-140, wherein each of the olefinic polymers is an ethylene-based copolymer.

Feature 142. The method according to any one of Features 129-141, wherein the ethylene-based copolymer is selected from the group consisting of a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; an ethylene-octene (POE) copolymer; an ethylene-butene (PEB) copolymer, any copolymer thereof, and any blend thereof.

Feature 143. The method according to any one of Features 129-142, wherein the ethylene-based copolymer is an ethylene-vinyl acetate (EVA) copolymer.

Feature 144. The method according to any one of Features 129-143, wherein the ethylene-vinyl acetate (EVA) copolymer has a vinyl acetate content of about 10% to about 45%.

Feature 145. The method according to any one of Features 129-144, wherein a ratio V of a total parts by weight of the olefinic polymers present in the composition to a total parts by weight of the ionomeric copolymers present in the composition is about 0.0 to about 0.6, about 0.0 to about 0.4, about 0.01 to about 0.4, or about 0.01 to about 0.6.

Feature 146. The method according to any one of Features 129-145, wherein the ratio V is about 0.1 to 0.4.

Feature 147. The method according to any one of Features 129-146, wherein each of the plurality of cations is a metal cation.

Feature 148. The method according to any one of Features 129-147, wherein each of the metal cations independently selected from the group consisting of a magnesium ion, a sodium ion, a potassium ion, a cesium ion, a calcium ion, a barium ion, a manganese ion, a copper ion, a zinc ion, a tin ion, a lithium ion, an alkali metal ion, an alkali earth metal ion, or a compound thereof.

Feature 149. The method according to any one of Features 129-148, wherein each of the plurality of cations is independently selected from the group consisting of a lithium ion, a sodium cation, a zinc cation, and a magnesium cation.

Feature 150. The method according to any one of Features 129-149, wherein each of the plurality of cations is an organic cation.

Feature 151. The method according to any one of Features 129-150, wherein each of the organic cations is independently selected from the group consisting of an ammonium ion, a pyridinium ion, a guanidinium ion, an imidazolium ion, a phosphonium ion, and a sulfonium ion.

Feature 152. The method according to any one of Features 129-151, wherein the article has a specific gravity of about 0.2 to about 0.35.

Feature 153. The method according to any one of Features 129-152, wherein the article has a specific gravity of about 0.1 to about 0.22.

Feature 154. The method according to any one of Features 129-153, wherein the article has an energy return of about 60% to about 85%.

Feature 155. The method according to any one of Features 129-154, wherein the article has an energy return of about 75% to about 90%.

Feature 156. The method according to any one of Features 129-155, wherein the article has a stiffness of about 40 N/mm to about 275 N/mm.

Feature 157. The method according to any one of Features 129-156, wherein the article has a stiffness of about 50 N/mm to about 85 N/mm.

Feature 158. The method according to any one of Features 129-157, wherein the article has a change in displacement at max loading of about 0.75 mm or less when measured on foam slabs having a thickness of about 1 cm, wherein the foam slabs are compressed for about 5000 cycles of compression from 0N to 300 N and back to 0 N per cycle.

Feature 159. The method according to any one of Features 129-158, wherein the article has a change in displacement at max loading of about 0.1 mm or less when measured on foam slabs having a thickness of about 1 cm, wherein the foam slabs are compressed for about 5000 cycles of compression from 0N to 300 N and back to 0 N per cycle, using a 45 mm diameter tupp as the compression head.

Feature 160. The method according to any one of Features 129-159, wherein the composition is substantially free of a chemical blowing agent or decomposition product thereof.

Feature 161. The method according to any one of Features 129-160, wherein the composition is substantially free of covalent crosslinks between the ionomers.

Feature 162. The method according to any one of Features 129-161, wherein the first pressure is about 25 MPa to 150 MPa.

163. The method according to any one of Features 129-162, wherein the second pressure is about 1 atm or less Feature 164. The method according to any one of Features 129-163, wherein the melt is at a temperature of about 170° C. to about 235° C.

Feature 165. The method according to any one of Features 129-164, wherein the mold is at a temperature of about 25° C. to about 50° C.

Feature 166. The method according to any one of Features 129-165, wherein the melt is formed in an interior of a barrel.

Feature 167. The method according to any one of Features 129-166, wherein the barrel comprises a feedstock hopper in fluid communication with the interior of the barrel; wherein the first composition is in the feedstock hopper and flows from the feedstock hopper into the interior of the barrel.

Feature 168. The method according to any one of Features 129-167, wherein the interior of the barrel comprises a screw for mixing the melt with the atmospheric gas to form the solution, and wherein the screw mixes the melt with the atmospheric gas to form the solution.

Feature 169. The method according to any one of Features 129-168, wherein the screw has a length of about 20 mm to about 50 mm.

Feature 170. The method according to any one of Features 129-169, wherein the barrel further comprises a nozzle at an end of the barrel opposite the feedstock hopper; and wherein the solution is injected into the mold through the nozzle.

Feature 171. The method according to any one of Features 129-170, wherein the nozzle is at a temperature of about 180° C. to about 230° C.

Feature 172. The method according to any one of Features 129-171, wherein the fluid is an atmospheric gas or a supercritical fluid thereof.

Feature 173. The method according to any one of Features 129-172, wherein the atmospheric gas is $N_2$, $CO_2$, or a mixture thereof.

Feature 174. The method according to any one of Features 129-173, wherein the fluid is a supercritical fluid when it is mixed with the melt to form the solution.

Feature 175. The method according to any one of Features 129-174, wherein the article comprises a total parts by weight of the gas from about 0.1% to about 3% by weight based upon a total weight of the article.

Feature 176. The method according to any one of Features 129-175, wherein the fluid is $N_2$ or a supercritical fluid thereof, and wherein the article comprises a total parts by weight of the $N_2$ from about 0.1% to about 0.3% by weight based upon a total weight of the article.

Feature 177. The method according to any one of Features 129-176, wherein the fluid is $CO_2$ or a supercritical fluid thereof, and wherein the article comprises a total parts by weight of the CO$_2$ from about 1% to about 3% by weight based upon a total weight of the article.

Feature 178. The method according to any one of Features 129-177, wherein the melt comprises a recycled material of a recycled foam article comprising the first composition.

Feature 179. The method according to any one of Features 129-178, further comprising cutting or grinding the molded foam to produce particulates, and melting the particulates into pellets to form the recycled material.

Feature 180. The method according to any one of Features 129-179, wherein the recycled foam article is an article according to any one of Features 1-54.

Feature 181. The method according to any one of Features 129-180, wherein the melt is formed from about 50%, about 40%, about 30%, or less of the recycled material from the recycled foam article.

Feature 182. The method according to any one of Features 129-181, wherein the melt is formed from about 50%, about 80%, or more of the recycled material from the recycled foam article.

Feature 183. The method according to any one of Features 129-182, wherein the melt is formed from about 100% of the recycled material from the recycled foam.

Feature 184. A foam article made by a process comprising cutting or grinding a previously molded foam article to form particulates, wherein the recycled foam article is an article according to any one of Features 1-54; melting the particulates into pellets to form the recycled material; and forming a foam article via a method according to any one of Features 55-183, wherein the recycled material is used to form the melt of the first composition.

Feature 185. The foam article according to Feature 184, wherein the melt comprises about 50%, about 80% or more of the recycled material of the recycled foam composition.

Feature 186. The foam article according to any one of Features 184-185, wherein the melt comprises about 100% of the recycled material of the recycled foam composition.

Feature 187. The foam article according to any one of Features 184-186, wherein the melt comprises about 50%, about 30%, or less of the recycled material of the recycled foam composition.

Feature 188. The foam article according to any one of Features 184-187, wherein the foam composition has a specific gravity within about 5% of a specific gravity of the recycled foam article when measured under the same conditions.

Feature 189. The foam article according to any one of Features 184-188, wherein the foam article has energy return within about 5% of an energy return of the recycled foam article when measured under the same conditions.

Feature 190. The foam article according to any one of Features 184-189, wherein the foam article has a stiffness within about 5% of a stiffness of the recycled foam article when measured under the same conditions.

Feature 191. The foam article according to any one of Features 184-190, wherein the foam article has a change in displacement at max loading within about 5% of a change in displacement at max loading of the recycled foam article when measured under the same conditions.

The invention claimed is:

1. An article of footwear comprising a mid-sole, an outsole, or both, wherein the midsole or outsole or both include a composition, wherein the composition comprises one or more ionomeric copolymers, wherein each of the one or more ionomeric copolymers includes chain units derived from one or more olefins and chain units derived from one or more ethylenically-unsaturated acid groups; and
a plurality of cations, wherein the cations ionically cross-link anionic groups from the acid groups in the ionomeric copolymers;
wherein the composition has a foam structure having a specific gravity of less than 0.7
wherein the composition has an energy return of about 75% to about 90%.

2. The article according to claim 1, wherein the ionomeric copolymers are terpolymers of ethylene, methyl acrylate, and acrylic acid.

3. The article according to claim 1, wherein a ratio II of a total parts by weight of the one or more ethylenically-unsaturated acid groups in the ionomeric copolymers to a total weight of the ionomeric copolymers is about 0.1-0.5.

4. The article according to claim 1, wherein the ionomeric copolymers are copolymers of ethylene, acrylic acid, and an acrylate.

5. The article according to claim 4, wherein a ratio III of a total parts by weight of the acrylic acid in the ionomeric copolymers to a total weight of the ionomeric copolymers is about 0.05 to about 0.6.

6. The article according to claim 4, wherein the acrylate is methyl acrylate or butyl acrylate.

7. The article according to claim 4, wherein a ratio IV of a total parts by weight of the acrylate in the ionomeric copolymers to a total weight of the ionomeric copolymers is about 5% to about 20%.

8. The article according to claim 1, wherein the composition further comprises one or more olefinic polymers.

9. The article according to claim 8, wherein each of the one or more olefinic polymers is independently selected from the group consisting of an ethylene-based copolymer, a propylene-based copolymer, and a butene-based copolymer.

10. The article according to claim 9, wherein at least one of the one or more olefinic polymers is an ethylene-based copolymer.

11. The article according to claim 10, wherein the ethylene-based copolymer is selected from the group consisting of a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; an ethylene-octene (POE) copolymer; an ethylene-butene (PEB) copolymer, any copolymer thereof, and any blend thereof.

12. The article according to claim 8, wherein a ratio V of a total parts by weight of the one or more olefinic polymers present in the composition to a total parts by weight of the ionomeric copolymers in the composition is about 0.01 to about 0.6.

13. The article according to claim 1, wherein each of the ionomeric copolymers comprises a plurality of a first repeat unit having a formula according to Formula I and a plurality of a second repeat unit having a formula according to Formula II,

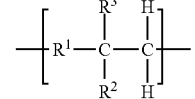

Formula I

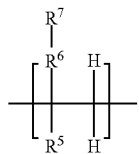

Formula II wherein each of the cations is crosslinking two or more of the second repeat units;

wherein each occurrence of $R^1$ is independently none, a substituted or unsubstituted $C_1$-$C_8$ alkyl, or a substituted or unsubstituted $C_2$-$C_8$ alkenyl;

wherein each occurrence of $R^2$ is independently hydrogen, a halogen, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, a substituted or unsubstituted $C_1$-$C_8$ alkoxy, or a substituted or unsubstituted $C_3$-$C_{12}$ alkyl ester;

wherein each occurrence of $R^3$ is independently hydrogen, a substituted or unsubstituted $C_1$-$C_8$ alkyl, or a substituted or unsubstituted $C_2$-$C_8$ alkenyl;

wherein each occurrence of $R^5$ is independently a hydrogen, a halogen, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, a substituted or unsubstituted $C_1$-$C_8$ alkoxy, or a substituted or unsubstituted $C_3$-$C_{12}$ alkyl ester;

wherein each occurrence of $R^6$ is independently none, a substituted or unsubstituted $C_1$-$C_8$ alkyl, a substituted or unsubstituted $C_2$-$C_8$ alkenyl, a substituted or unsubstituted phenyl, a substituted or unsubstituted alkyl-phenyl, or a substituted or unsubstituted $C_1$-$C_8$ alkoxy; and wherein each occurrence of $R^7$ is independently a carboxylate, a sulfate, a sulfonate, a nitrate, a phosphate, a phosphonate, or another negatively charged functional group.

14. The article according to claim 13, wherein a ratio II of a total parts by weight of the second repeat unit to a total weight of the ionomeric copolymers is about 0.1 to about 0.6.

15. The article according to claim 1, wherein each of the plurality of cations is a metal cation.

16. The article according to claim 1, wherein each of the plurality of cations is an organic cation.

17. The article according to claim 8, wherein the one or more olefinic polymers have a melt flow index of about 0.5-2.5.

18. The article according to claim 1, wherein the composition has a specific gravity of about 0.2 to about 0.35.

* * * * *